US012798997B2

(12) United States Patent
Veloo et al.

(10) Patent No.: US 12,798,997 B2
(45) Date of Patent: Nov. 17, 2026

(54) SYSTEMS AND METHODS FOR SENSORLESS ESTIMATION OF WATER SOFTENER SALT LEVEL AND REGENERATION CYCLING

(71) Applicant: Pentair Residential Filtration, LLC, Brookfield, WI (US)

(72) Inventors: Balagru Veloo, Gurnee, IL (US); Matthew Podella, Sussex, WI (US)

(73) Assignee: Pentair Residential Filtration, LLC, Brookfield, WI (US)

( * ) Notice: Subject to any disclaimer, the term of this patent is extended or adjusted under 35 U.S.C. 154(b) by 812 days.

(21) Appl. No.: 17/595,155

(22) PCT Filed: May 11, 2020

(86) PCT No.: PCT/US2020/070040

§ 371 (c)(1),
(2) Date: Nov. 10, 2021

(87) PCT Pub. No.: WO2020/232468

PCT Pub. Date: Nov. 19, 2020

(65) Prior Publication Data

US 2022/0212952 A1 Jul. 7, 2022

Related U.S. Application Data

(60) Provisional application No. 62/846,259, filed on May 10, 2019.

(51) Int. Cl.

| | |
|---|---|
| ***C02F 1/42*** | (2023.01) |
| ***B01J 49/75*** | (2017.01) |
| ***C02F 1/00*** | (2023.01) |

(52) U.S. Cl.

CPC ................ *C02F 1/008* (2013.01); *C02F 1/42* (2013.01); *C02F 2209/005* (2013.01);
(Continued)

(58) Field of Classification Search

CPC ...... C02F 1/008; C02F 1/42; C02F 2209/005; C02F 2209/40; C02F 2209/44; C02F 2303/16; C02F 2209/006; G06Q 50/06
See application file for complete search history.

(56) References Cited

U.S. PATENT DOCUMENTS

| | | | | |
|---|---|---|---|---|
| 4,722,797 A | | 2/1988 | Gauer et al. | |
| 2003/0132848 A1 | * | 7/2003 | Zimmerman ............. | C02F 1/42 210/86 |

(Continued)

FOREIGN PATENT DOCUMENTS

| | | | |
|---|---|---|---|
| CA | 3016776 | | 4/2019 |
| EP | 2352589 | * | 12/2012 |

(Continued)

OTHER PUBLICATIONS

English language machine translation of JP2009056383, 10 pages, No Date.*

(Continued)

*Primary Examiner* — Pranav N Patel
(74) *Attorney, Agent, or Firm* — Husch Blackwell LLP

(57) ABSTRACT

The present disclosure relates to systems and methods for determining an estimated number of regenerations remaining, an estimated salt remaining, an estimated period between regenerations, an estimated time until salt refill and/or an estimated time until depletion for a water softener system. The estimated period between regenerations may be determined based on water usage data derived from flow rate data generated by a smart flow meter coupled to an output of the water softener system. A processor may send one or more salt refill alerts to one or more electronic devices in response to determining that the time until a salt refill is needed is less than one or more predetermined thresholds.

18 Claims, 12 Drawing Sheets

(52) U.S. Cl.
CPC ...... *C02F 2209/40* (2013.01); *C02F 2209/44* (2013.01); *C02F 2303/16* (2013.01)

(56) References Cited

U.S. PATENT DOCUMENTS

| | | | | |
|---|---|---|---|---|
| 2015/0090663 A1* | 4/2015 | Gruett | C02F 1/42 210/673 |
| 2016/0052798 A1* | 2/2016 | Downs | B01J 49/75 210/85 |

FOREIGN PATENT DOCUMENTS

| | | |
|---|---|---|
| JP | 2009056383 A | 3/2009 |
| JP | 2010104907 A | 5/2010 |
| KR | 1020130123737 A | 11/2013 |

OTHER PUBLICATIONS

English language machine translation of EP 2352589B1, 6 pages, No. Date.*
International Search Report and Written Opinion, International Application No. PCT/US2020/070040, dated Aug. 26, 2020, 10 pages.
Extended European Search Report issued for European Patent Application No. 20805994.9 dated May 30, 2023, 8 pages.
Communication pursuant to Article 94(3) EPC issued for European Patent Application No. 20 805 994.9 dated Jan. 28, 2026, 9 pages.
Office Action issued for Canadian Application No. 3,140,125, dated Apr. 16, 2025, 5 pages.
International Preliminary Report on Patentability issued for International Application No. PCT/US2020/070040, mailed Nov. 25, 2021, 9 pages.

* cited by examiner

SYSTEMS AND METHODS FOR SENSORLESS ESTIMATION OF WATER SOFTENER SALT LEVEL AND REGENERATION CYCLING

RELATED APPLICATIONS

This application claims priority to U.S. Provisional Application No. 62/846,259 filed on May 10, 2019, the entire disclosure of which is incorporated herein by reference.

BACKGROUND

Water supplied to a home or business, whether through a well or a municipal water supply, may be used in a variety of applications such as drinking, cooking, showers, baths, toilets, pools, agricultural maintenance, and even heat. In some regions, high mineral content causes water to be "hard," causing mineral buildup in pipes, reducing flow to taps and appliances, and leaving filmy residue on washed items such as dishes or vehicles. In order to reduce the mineral content of water, a water softener may be installed in a home or business, which extracts minerals from the water using an ion exchange process in which minerals in the water are exchanged for salt. Conventional water softeners include a reservoir, called a brine tank, which stores salt used in the ion exchange. The resin bed of the water softener must be regenerated periodically via backwashing, brining, and rinsing, as ion content of the resin bed becomes depleted over time. Salt must be manually added to the brine tank periodically, as salt is consumed in the water softener regeneration process. As salt consumption tends to vary with water usage, it may be difficult for a home or business owner to predict when the brine tank should be refilled.

SUMMARY

In light of the deficiencies described above, new systems and methods for providing the ability to predict the salt level of a water softener system and determine a frequency of regeneration of the resin bed of a water softener system of a home or business and to electronically alert the home or business owner when the brine tank should be refilled with salt are desirable.

Some embodiments provide a water softener system including a brine tank, an outlet pipe, and a sensor device coupled to the outlet pipe, and a controller. The sensor device is configured to generate flow rate data in response to fluid moving through the outlet pipe. The controller is in electronic communication with the water softener system. The controller is configured to determine an estimated salt remaining value, determine an estimated number of regenerations remaining, and generate water usage data based on the flow rate data. The controller is also configured to determine an estimated period between regenerations value based on the water usage data, determine an estimated time until salt refill, determine whether the estimated time until salt refill is below a predetermined threshold, and send an alert to an electronic device in electronic communication with the controller, the alert indicating that salt should be added to the brine tank.

In some forms, the predetermined threshold includes at least an intermediate threshold, a critical threshold, and an empty threshold. In some forms, the controller initiates a regeneration operation of the water softener system. The controller updates the estimated salt remaining value based on user input from the electronic device. In some forms, the controller determines the estimated number of regenerations remaining by dividing the estimated salt remaining value by a predefined salt dosage corresponding to an amount of salt expected to be used during a single regeneration operation. In some forms, the controller estimates the estimated period between regenerations by dividing a first quantity by a second quantity, the first quantity being a unit capacity divided by a water hardness value and the second quantity being an average water use over a predefined period determined based on the water usage data. In some forms, the controller determines the estimated period between regenerations value by dividing a first quantity by a second quantity, the first quantity being calculated by dividing a unit capacity by a water hardness value and then subtracting a predefined portion of resin bed capacity, and the second quantity being an average water use over a predefined period determined based on the water usage data.

In some forms, the controller reduces the estimated salt remaining value by a predefined salt dosage in response to the regeneration operation. The controller sets the estimated period between regenerations value to a default value when sufficient water usage data is not available. In some forms, the default value is four days. In some forms, the controller determines the estimated time until salt refill by multiplying the estimated period between regenerations value and the estimated number of regenerations remaining. In some forms, the estimated number of regenerations value corresponds to an estimate of a number of regenerations that can be performed by the water softener system before the brine tank needs to be refilled with salt.

In some forms, the controller causes a first prompt to be displayed on a user interface of the electronic device, the first prompt providing a plurality of selectable options, each of the plurality of selectable options including a respectively different qualitative description of the salt in the brine tank. The controller compares, based on a selected option from the plurality of selectable options, the estimated number of regenerations value to a predetermined regeneration threshold to produce a result, and adjusts the estimated salt remaining value based on the result. The controller causes a second prompt to be displayed on the user interface, the second prompt displaying an option to provide one of an amount added or an amount reduced; receives the one of an amount added or an amount reduced via the user interface; and adjusts the estimated salt remaining value based on the one of an amount added or an amount reduced received. The controller causes the estimated salt remaining value to be displayed on a user interface of the electronic device.

Some embodiments provide a water softener system having a brine tank, an outlet pipe, a sensor device coupled to the outlet pipe, and a controller. The sensor device is configured to generate flow rate data in response to fluid moving through the outlet pipe. The controller is configured to determine an estimated salt remaining value, determine an estimated number of regenerations remaining, and determine an estimated period between regenerations value. The controller determines an estimated time until salt refill, determines whether the estimated time until salt refill is below a predetermined threshold, and sends an alert to an electronic device in electronic communication with the controller, the alert indicating that salt should be added to the brine tank.

In some forms, the estimated period between regenerations is a default value based on a defined regeneration schedule. In some forms, the controller generates water usage data based on the flow rate data, and the estimated period between regenerations value is based on the water usage data. The controller initiates a regeneration operation of the water softener system. The controller reduces the estimated salt remaining value by a predefined salt dosage in response to the regeneration operation.

Some embodiments provide a method of determining when salt in a brine tank of a water softener system should be refilled. The method includes the steps of determining an estimated salt remaining value, determining an estimated number of regenerations remaining, and determining whether water usage data is available. The method further includes the steps of determining an estimated period between regenerations value based on the water usage data, determining an estimated time until salt refill, determining whether the estimated time until salt refill has fallen below a predetermined threshold, and sending an alert to an electronic device in electronic communication with the controller, the alert indicating that salt should be added to the brine tank. The method additionally includes the steps of determining whether salt has been added to the brine tank, determining whether new water usage data is available, and determining whether a regeneration has occurred. The method also includes the step of reducing the estimated salt remaining value and updating the estimated salt remaining value when one of the salt has been added to the brine tank, the regeneration has occurred, or the new water usage data is available.

In some forms, the estimated time until salt refill is calculated by the product of the estimated period between regenerations value and the estimated number of regenerations remaining. In some forms, the predetermined threshold is one or more predetermined thresholds corresponding to one or more lengths of time. In some forms, the one or more lengths of time are, for example, fourteen days, seven days, and zero days.

Some embodiments provide a method of acquiring information related to an amount of salt that is in a brine tank of a water softener system. The method includes the steps of causing a first prompt to be displayed on a user interface of the electronic device, the first prompt providing a plurality of selectable options and each of the plurality of selectable options including a respectively different qualitative description of the salt in the brine tank. The method also includes the steps of comparing, based on a selected option from the plurality of selectable options, the estimated number of regenerations to a predetermined regeneration threshold to produce a result, and adjusting the estimated salt remaining value based on the result. The method further includes the steps of causing a second prompt to be displayed on the user interface, the second prompt displaying an option to provide one of an amount added or an amount reduced, receiving the one of an amount added or an amount reduced via the user interface, and adjusting the estimated salt remaining value based on the one of an amount added or an amount reduced received.

Some embodiments provide a method of estimating the time until initiation of the next regeneration cycle of a water softener system. The method includes the step of determining whether at least seven consecutive days of water usage data is available in a memory of a controller of the water softener system. The method also includes the steps of determining an average daily water usage for each respective day of the week and comparing the water usage of one of the each respective days of the week to a remaining capacity of a resin bed of the water softener system. The method further includes the steps of tracking a number of hours elapsed since a most recent regeneration and calculating an estimated time until regeneration. In some forms, the method includes the step of setting an estimated days between regenerations to a default value based on a defined regeneration schedule.

DESCRIPTION OF THE DRAWINGS

The invention will be better understood and features, aspects and advantages other than those set forth above will become apparent when consideration is given to the following detailed description. Such detailed description makes reference to the following drawings.

DETAILED DESCRIPTION

Figure 1:
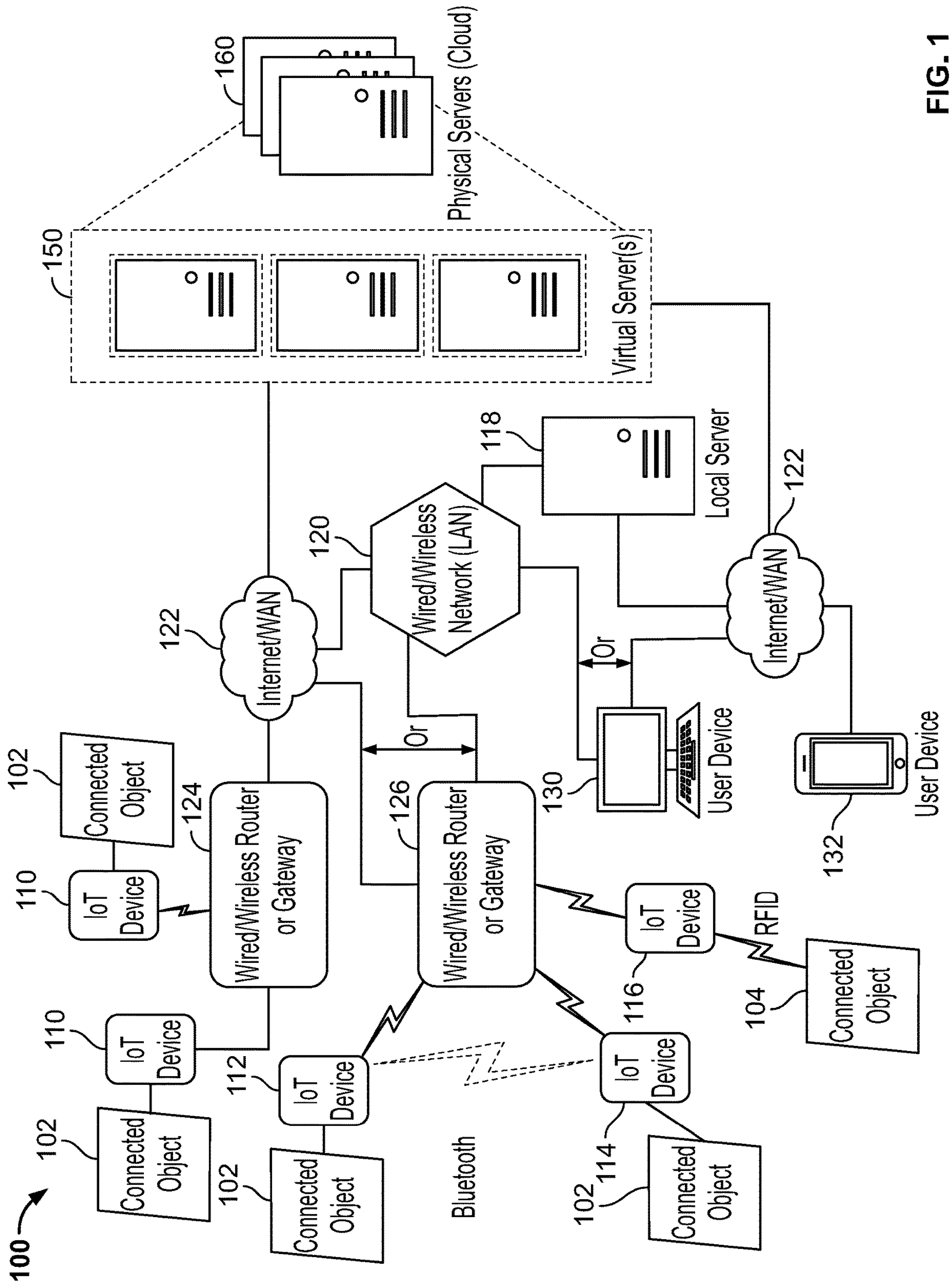
FIG. 1 is a diagram of a computing environment for deploying Internet of Things (IoT) devices in accordance with various embodiments of the invention.

Before any embodiments are described in detail, it is to be understood that the invention is not limited in its application to the details of construction and the arrangement of components set forth in the following description or illustrated in the following drawings, which is limited only by the claims that follow the present disclosure. The invention is capable of other embodiments, and of being practiced, or of being carried out, in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following description is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. Skilled artisans will recognize the examples provided herein have many useful alternatives and fall within the scope of embodiments of the invention.

Additionally, while the following discussion may describe features associated with specific devices, it is understood that additional devices and or features can be used with the described systems and methods, and that the discussed devices and features are used to provide examples of possible embodiments, without being limited.

FIG. 1 illustrates an example computing environment 100 for wired and/or wireless monitoring and control of electronic and mechanical devices that are deployed in a physical environment, such as a home or residential environment, a commercial building, a farm or other agricultural facility, industrial environments such as factories and refineries, and any other physical environment where it is feasible and beneficial to deploy so-called "smart" devices, which are natively or retroactively enabled to connect to the internet or another wide-area network (WAN) 122 to send and receive electronic data. In particular, such devices become "connected objects" 102, 104 in the computing environment 100 by interfacing with an internet enabled device, referred to as an "Internet-of-Things" (IoT) device, in accordance with various embodiments described herein. Other significant entities, such as a person, an animal (e.g., a farm animal), a pipe or pipeline, a body of water, or the physical environment itself, may become a connected object 102, 104 in the computing environment 100 by interfacing with an IoT device. The interface or connection between a connected object 102, 104 and an IoT device 110, 112, 114, 116 may depend on several factors, non-limiting examples of which include: whether the object is electronic, mechanical, organic, etc.; whether the object is "natively" connected, having the IoT device or another transmitter built-in, or the IoT device is added or connected to the object to make the object "connected;" whether the IoT device connects directly to the connected object, and/or connects to other objects or must be disposed in a particular location (e.g., to deploy a sensor); and, whether the IoT device sends data to the connected object, receives data from the connected object, or both. Example interfaces/connections are described below with respect to FIGS. 1 and 2.

Each of the IoT devices 110-116 may be embedded with electronics, software, sensors, actuators, and network connectivity, either within the device itself or in cooperation with connected servers 118, 160, which enable the IoT devices 110-116 and their embedded software to collect and exchange data. In some embodiments, various IoT devices 110-116 in the computing environment 100 may send and/or receive data transmissions over a local area network (LAN) 120, WAN 122, and/or another communication network using any suitable communication protocol. For example, the IoT devices 112-116 may communicate over the LAN 120 with a local server computing device 118, such as in a private network where transmitted data to/from the IoT devices is isolated from the internet or another WAN 122, at least until the data is processed by the local server 118. In some embodiments, (a) local server(s) 118 may be operated at the same location as the IoT devices 112-116, such as at a residence or in an office building. A user device 130 may also be connected to the LAN 120 in order to access the IoT data as described below; alternatively, IP connectivity may be used, connecting the LAN 120 and/or the local server(s) 118 to the Internet or another WAN 122, so that local and/or remote user devices 130, 132 can access the local server 118.

In still other embodiments, IoT devices 110-116 may connect, directly or through a router, gateway, base station, etc. (shown as wired/wireless router or gateway 124, 126), to the WAN 122 in order to communicate with cloud-based computing resources. Such an environment provides a bi-directional, direct-to-cloud communication between the IoT devices 110-116 and one or more application and/or hosting servers. In some embodiments, IoT devices 110-116 may communicate with and directly use the resources of one or more physical, remote server computing devices 160, which may be deployed in one or more data centers (for example) in a particular geographic location or dispersed throughout several geographic locations. In other embodiments, the remote physical servers 160 may cooperate to provide virtualized computing resources that can be allocated for use by, for example, an authorized user of a computing resource service provider. Thus, a user that controls, or provides services for, the IoT devices 110-116 may configure and deploy one or more virtual servers 150 that are allocated the use of certain physical computing resources, such as processor cycles, memory, data storage, etc., of the physical servers 160; the IoT devices 110-116 may, in turn, be configured to connect to the virtual servers 150. For example, an IoT device 110 may be programmed to connect to an IP address associated with an endpoint that connects a virtual network adapter of the servers 150 to a physical network adapter of the physical servers 160. The virtual servers 150, or the computing resource service provider's computing environment in which the virtual servers 150 are deployed, may provide other computing resource services for implementing an IoT platform as described further below.

Given this bi-directional, cloud-based environment, each IoT device 110-116 may be deployed as a direct-to-cloud IoT device. In other words, the deployment of multiple IoT devices 110-116 in a LAN-based or cloud-based environment provides for an internetworking of physical devices, connected devices, and/or smart devices at the network level. Various communication protocols between components may be used, depending on the types of devices connecting to each other and the type, amount, and frequency of data being exchanged. Non-limiting examples of connection protocols include: an IoT device 110, such as a base station or fixture, may have a wired (e.g., CAT5, USB) connection to a router 124 and may use any TCP/IP protocol for wired connections; or, an IoT device 110 may have a wireless connection to a router 124, and may use wireless TCP/IP protocols such as WiFi or MQTT; an IoT device 112 may communicate directly with another IoT device 114 using the above wireless protocols or other suitable protocols such as Bluetooth; IoT device 110-114 connections to a connected object 102 may be wired, or may be indirect based on a sensor interface; or, an IoT device 116 may connect wirelessly to the connected object 104, using a suitable protocol such as RFID for an RFID-enabled connected object 104. More generally, a communication network can include a Wi-Fi network (e.g., an 802.11x network, which can include one or more wireless routers, one or more switches, etc.), a peer-to-peer network (e.g., a Bluetooth network, a ZigBee® network, a Z-Wave® network, a proprietary RF connection, etc.), a cellular network (e.g., a 3G network, a 4G network, etc., complying with any suitable standard, such as CDMA, GSM, LTE, LTE Advanced, WiMAX, etc.), a wired network, an EnOcean® network, etc. In some embodiments, the communication network can be a LAN, a WAN, a public network (e.g., the Internet), a private or semi-private network (e.g., a corporate or university intranet), any other suitable type of network, or any suitable combination of networks. Communications links between the IoT devices 110-116, the router/modem 124, 126, the local server 118, the LAN 120, the cloud based server(s) 160 and/or the virtual server(s) 150, can each be any suitable communications link or combination of communications links, such as wired links, fiber optic links, Wi-Fi links, Bluetooth links, cellular links, etc.

A user may operate one or more client computing devices 130, such as a desktop or laptop computer, or a mobile computing device 132 such as a phone or tablet, running client software that enables the device 130, 132 to access an interface to the IoT platform provided by a server 118, 150, 160. Each of these client computing devices 130, 132 may include at least one processor executing specific computer-executable instructions (i.e., the running software) stored in a memory coupled to the client computing device 130, 132. The user may access and run a client-based software such as a web browser or web application, in order to request access to the system level software and/or a GUI (e.g., by entering a Uniform Resource Locator (URL) for a web page including the GUI). This request may identify the IP address for the server(s), as well as instructions to generate and render the GUI and/or web page for the system level software. The server(s) may execute one or more software instructions to generate and render the GUI, and transmit it to the client computing device 130, 132 for display. The server(s) 118, 150, 160 may include components and data processing capabilities used to host and run software applications that allow for bi-directional communication between each IoT device 110-116 and the server(s) 118, 150, 160. For example, the server(s) 118, 150, 160 may host the customizable software that is deployed to, and installed on, each IoT device 110-116. The server(s) 118, 150, 160 may also run the software and protocols for other services used by the IoT platform, as well as for the interface to the client computing devices 130, 132. Example uses of the user interface to the IoT platform include configuring and deploying server resources, configuring and deploying software and settings for IoT devices, obtaining and/or reviewing data collected by the server(s) from the IoT devices 110-116 (e.g., viewing current status), performing and/or reviewing data analysis, accessing particular IoT devices 110-116, etc.

Figure 2:
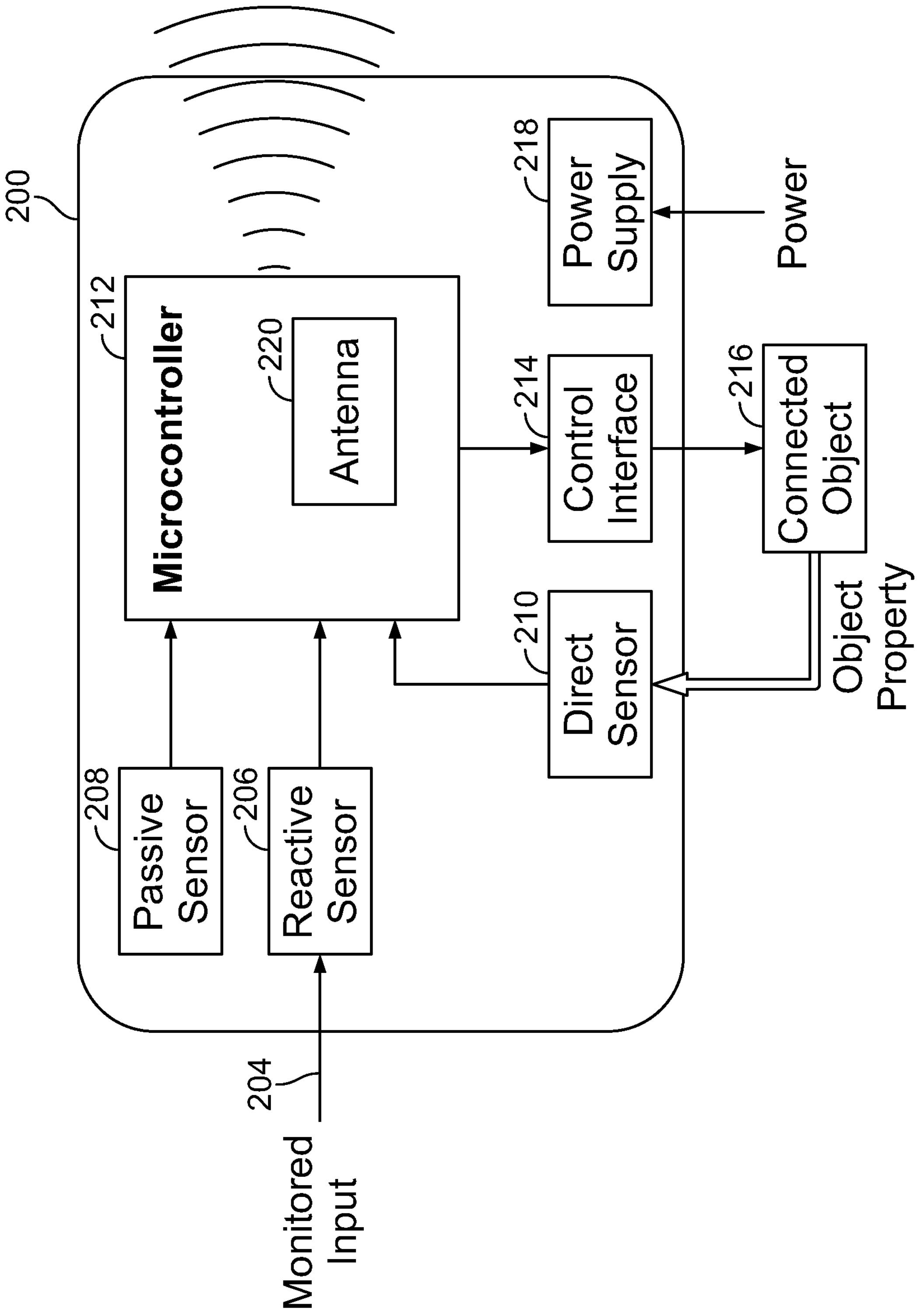
FIG. 2 is a block diagram of an example embodiment of an IoT device.

FIG. 2 shows the internal (i.e., partially or fully inside a housing) components of an example IoT device 200 in accordance with some embodiments of the invention (e.g., as an example of one or more of the IoT devices 110-116 of FIG. 1). As shown in FIG. 2, an IoT device 200 may serve to both collect data associated with a connected object 216, and control one or more operations and/or operating parameters of the connected object 216; in other embodiments, an IoT device for the connected object 216 may only collect and report data, or only control operations/configurations of the connected object 216. To collect data associated with the connected object 216, the IoT device 200 may include, connect to, or communicate with one or more of several different types of sensors. Non-limiting examples of types of sensors that may cooperate with or be incorporated in the IoT device 200 include reactive sensors 206, passive sensors 208, and direct sensors 210, among others. A reactive sensor 206 can detect and report certain monitored inputs 204 on the connected object 216 or the IoT device 200 itself; examples include a pressure transducer that detects a button press or a fluid pressure level, a moisture sensor, a flow rate sensor, a photodiode or other light receptor, and a sample analyzer that collects a sample (e.g., of water in which the sensor 206 is submerged) and measures a property of the sample (e.g., total dissolved solids. A sample analyzer may also be a direct sensor 210 if the connected object 216 is a body of water (as opposed to a water filter in the body of water). A passive sensor 208 can detect environmental and other ambient properties; examples include an ambient temperature sensor, an ambient light sensor (e.g., for sunlight), a humidistat, etc. A direct sensor 210 can be connected to the connected object 216, or in communication therewith, or otherwise oriented to monitor one or more specific properties of the connected object 216; examples include a thermistor for monitoring the temperature of the connected object 216, a biometric sensor, a sample analyzer (e.g., of water at the inlet or outlet of a water filter), a current sensor, a speed sensor, etc.

Any of the sensors 206-210 may be configured to monitor a corresponding property continuously, at intervals, or randomly, and/or may "listen" for inputs and react when they are detected. Sensors 206-210 may also continuously generate data, or may only generate data at intervals, or only when the monitored property meets one or more particular values; the generated data may describe the state of the property being measured. The sensors 206-210 may send the data to a microcontroller 212 of the IoT device 200. A microcontroller 212 may be any suitable microprocessor, including single- and multi-core CPUs, wireless-enabled microcontrollers, and other known microcontrollers having the processing power to receive data from the sensors and transmit the data to a receiving device such as a gateway/router or a local or cloud server. In some embodiments, the microcontroller 212 can be configured to itself act as a wireless gateway module. For example, the microcontroller 212 can be implemented using a single-chip wireless microcontroller, such as the CC3200MOD microcontroller available from Texas Instruments® (of Dallas, Texas), which can include a CC3200R1M2RGC microcontroller from Texas Instruments®. The microcontroller 212 may further have sufficient computing power to receive control commands from a router/gateway, a server, another IoT device, or a client computing device, and deliver the control commands to the connected object 216 as described below. The microcontroller 212 may further have sufficient resources to store and execute data analysis algorithms, such as processing methods that enable the microcontroller 212 to evaluate sensor 206-210 data and issue control commands to the connected object 216 based on the evaluated data. For example, the microcontroller 212 and/or the IoT device 200 can include any suitable volatile memory, non-volatile memory, storage, or any suitable combination thereof. For example, the memory can include RAM, ROM, EEPROM, one or more flash drives, one or more hard disks, one or more solid state drives, one or more optical drives, etc. In some embodiments, the memory can have encoded thereon a computer program for controlling operation of a hardware processor (e.g., microcontroller 212) in the form of computer executable instructions that, when executed by the hardware processor, cause the hardware processor to perform one or more actions as indicated by the instructions.

In some embodiments, the microcontroller 212 or the IoT device 200 can include one or more antennas 220 configured to send and/or receive wireless signals, such as signals for communicating over Wi-Fi, Bluetooth, ZigBee, Z-Wave, free-space optical, etc. In some such embodiments, the antenna(s) 220 can receive signals from the wireless gateway module and can transmit the signals to the microcontroller 212 for processing into commands. Additionally, or alternatively, the antenna 220 can send signals generated by the microcontroller 212 to the wireless gateway/router. In some embodiments, the antenna(s) 220 can be an integral part of the microcontroller 212. Alternatively, in some embodiments, the antenna 220 can be mounted to a printed circuit board (PCB) and electrically connected to the microcontroller 212, and/or can be mounted to a housing of the IoT device 200. In some embodiments, the IoT device 200 can communicate with server(s) and/or other IoT devices in the network using the antenna(s) 220. For example, the IoT device 200 can use the antenna(s) 220 to communicate using a direct connection (e.g., over a Bluetooth connection, over a direct Wi-Fi connection such as an ad hoc Wi-Fi connection or Direct Wi-Fi connection), and/or an indirect connection (e.g., over a LAN, over a mesh network, etc.).

In some embodiments, the IoT device 200 can include a control interface 214 that enables the IoT device 200 to control operations and/or to change configuration settings or other data of the connected object 216. The control interface 214 may include any suitable electrical and/or electronic components and connections needed to enable the desired control of the connected object 216. For example, a control interface 214 for a water softener can connect to the power supply circuit of the water softener and, based on signals from the microcontroller 212, selectively provide power for operation of the water softener. In this example, the control interface 214 or the IoT device 200 can be connected to both a source of power (e.g., a household electrical grid) and wires/cable(s) connected to the water softener, and can either provide power to the water softener or inhibit power from being provided to the water softener. The microcontroller 212 may provide the appropriate format of signal to cause the control interface 214 to apply the desired control. For example, in an analog environment such as the power control or valve control, the control interface 214 may be a series of switches, and the microcontroller 212 may send one or more signals that open or close the switches as needed to apply the desired power setting or valve configuration, respectively. In another example, the connected object 216 may be a digital device, and the control interface 214 may be an API that converts the microcontroller 212 control signals to function calls that the control interface 214 sends to the connected object 216 to change its operating parameters.

In some embodiments, the IoT device 200 can include a power supply 218 that can provide power for operation of the microcontroller 212 and/or any other suitable low voltage devices within the IoT device 200. For example, the IoT device 200 can receive input power at 230 V and 60 Hertz (Hz), which is not suitable for operation of the microcontroller 212, which is typically a low voltage device (e.g., operating at 3.3 V DC, 5 V DC, 12 V DC, 24 V DC, etc.). In some embodiments, power supply 218 can receive AC power (e.g., at 230 V, 60 Hz), convert the AC power to low voltage DC power, and distribute power to one or more other components of the IoT device 200, such as the microcontroller 212. In other embodiments, the power supply 218 may be one or more onboard batteries (e.g., AAA batteries) contained within the housing of the IoT device 200. The power supply 218 may provide power in a variety of other ways, for example, from harvested energy, wirelessly through inductive coupling or resonant inductive coupling, or in any other known way. In some embodiments, the power supply 218 or another energy storage device such as a battery, an ultracapacitor, a fuel cell, etc., can provide supplemental power to continue to operate the IoT device 200 when an external power supply is interrupted, or a primary battery fails.

Figure 3:
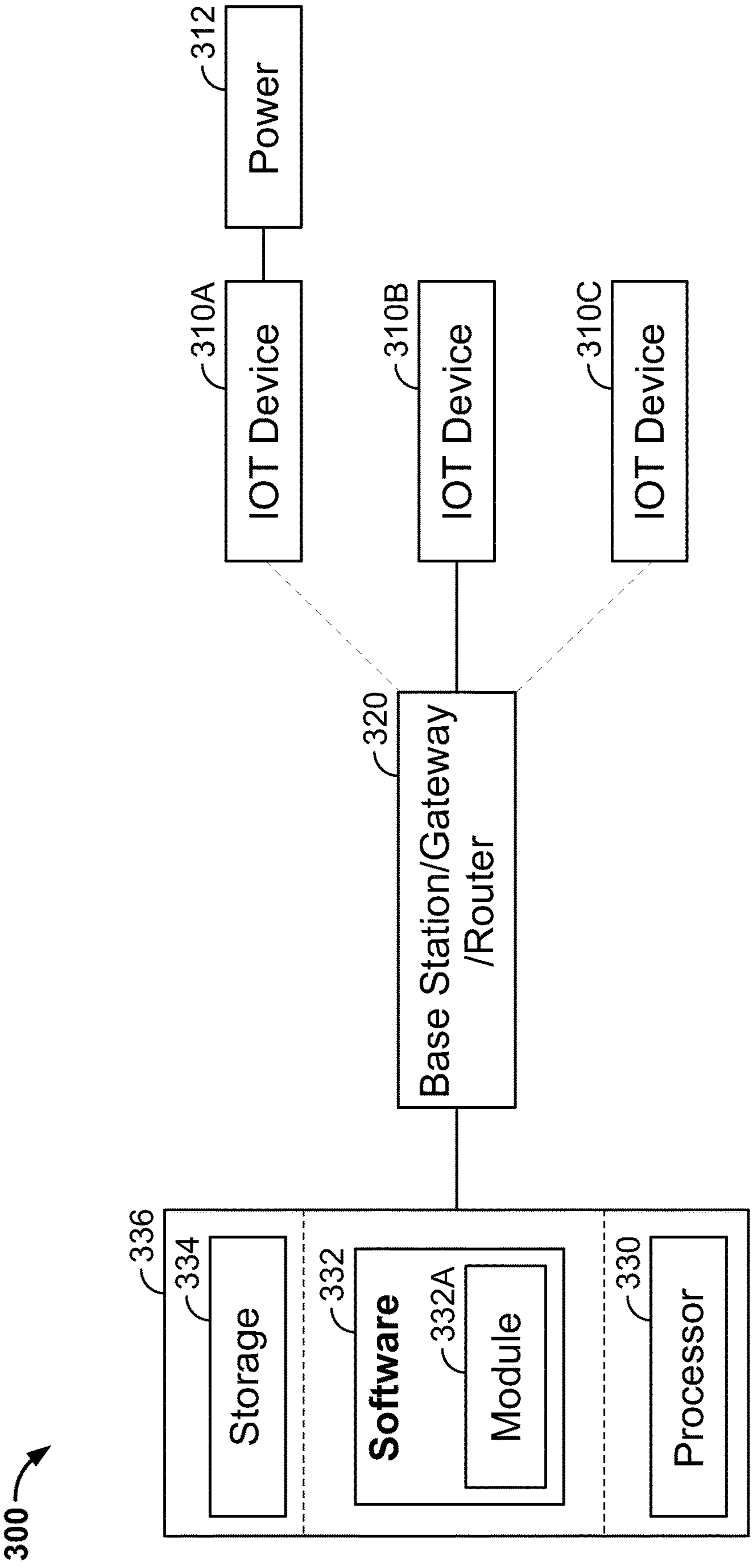
FIG. 3 is a block diagram of an example embodiment of a system in accordance with embodiments of the invention, including a server and IoT devices.

FIG. 3 is a block diagram 300 that illustrates additional details of a communication system. The block diagram 300 includes IoT devices 310A-C, a power source 312, a base station, router, or gateway 320, a server 336, a processor 330, software 332, and storage 334.

As described above, the IoT devices 310 may sense data about the environment and/or users and/or a connected object. An IoT device 310A-C can provide raw sensor data and/or processed sensor data to the server 336 via the gateway 320. Additionally, or alternatively, the IoT devices 310 may receive data, such as control signals generated by the server 336 or a client computing device or sensor data from other IoT devices, from the server 336 via the gateway 320. The IoT devices 310 may communicate with the gateway 320 through a wired (e.g., IoT device 310B) or wireless connection. The IoT device 310B may also receive power through its wired connection with the gateway 320. The IoT device 310A receives power from a power source 312. The IoT device 310C does not have a separate power source and may instead rely on piezoelectric technology or other technology to provide sufficient energy for transmitting information to the gateway 320. Depending on the embodiment, the IoT devices 310 may employ a range of technologies. For example, the IoT devices 310 may detect heat or pressure changes, may detect touch, or may detect changes in a variety of health indicators. Certain IoT devices 310 may rely on Bluetooth, iBeacon, or near field communication technology. In some embodiments, the IoT devices 310 may include an accelerometer. The IoT devices 310 may be present in a variety of locations within an organization's environment. The IoT devices 310 may be embedded in an article of furniture, such as a chair or table, or may be embedded in or coupled to a wall, partition, ceiling, of floor. The IoT devices 310 may also be associated with a user, present, for example, in a user's identification badge or mobile communication device (e.g., a smartphone, in a wrist worn device, etc.).

The gateway 320 relays information to the server 336 and may be coupled to the server 336 via a LAN or wide area network (WAN). The gateway 320 may be any device suitable to receive, aggregate, and/or relay information from the IoT devices 310A-C, including, for example, a wireless router or a Room Wizard™. The gateway 320 may include existing technology affiliated with other services of an organization or may be provided to an organization specifically for use with IoT devices 310. For example, a gateway 320 may be a base station comprising computing resources, such as a processor, memory, and specific program instructions (e.g., software or firmware) that the processor executes to communicate with and/or monitor deployed IoT devices 310. In some embodiments, more than one gateway 320 may be used to optimize performance. For example, the number and/or positioning of gateways may depend on the number and/or positioning of the IoT devices 310.

As information from one or more IoT devices 310 reaches the server 336, software 332 may determine how the information is processed. In this embodiment, a software module 332A can configure a commands processor 330 to perform a variety of tasks, such as processing collected data from IoT devices 310, and/or sending control signals to IoT devices 310 for controlling the corresponding connected object(s). For example, the processor 330 may analyze incoming data related to a user's location, orientation, or interaction with a client computing device. The processor 330 may make determinations or conclusions about a user or group of users, or an object or group of objects, or other environmental or input conditions, based on incoming data. The processor 330 may also relay information or send conclusions to a user or group of users. Incoming data from IoT devices 310, other incoming data or inputs, conclusions, and other data may be stored in storage 334.

In various embodiments, the server 336 may be a virtual server or may represent a cluster of servers. Some or all portions of the block diagram may be located physically on site at an organization's location and some or all may be stored remotely in the cloud. For example, in one embodiment, the server 336 may physically include the processor 330 while the software 332, the software module 332A, and the storage 334 are located in a remote or cloud server. In another embodiment, only the software 332 or the storage 334 may be located in a remote or cloud server. The software module 332A may additionally communicate with a variety of other servers, processors, hardware, and software located in the server 336 or in other servers or other locations. For example, the software module 332A may communicate with a second server to ensure that a user's calendar or reservation information is up-to-date.

Figure 4:
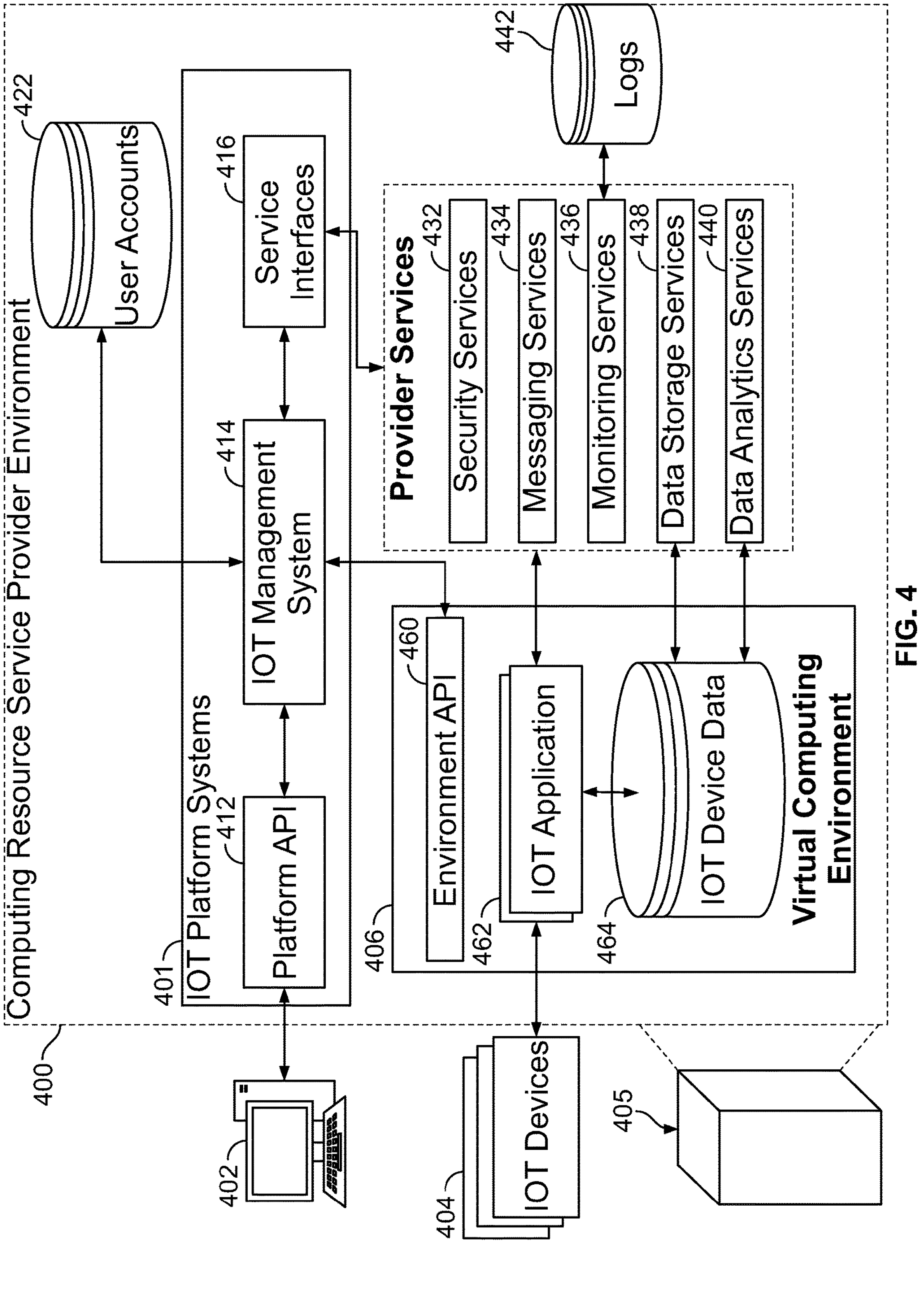
FIG. 4 is a block diagram of an example embodiment of another computing environment in accordance with some embodiments of the invention.

Referring to FIG. 4, embodiments of the invention may operate within or upon computing systems (e.g., a hardware computing device 405) of a computing resource service provider that provide a computing environment 400 accessible, via one or more computer networks, by users of user computing devices 402 and by one or more IoT devices 404 configured and deployed as described above. The computing environment 400 may, for example, be provided by the virtual servers 150 and/or the physical servers 160 of FIG. 1 (i.e., the computing device 405 may be one of the physical servers 160 of FIG. 1). That is, where FIG. 1 illustrates the conceptual operation of the present systems and methods in interaction, via computing devices 130, 132, with a "client," or administrator of IoT devices 110-116 deployed in a computing environment 100, FIG. 4 illustrates a computing architecture in which a client may access the computing systems of the computing resource service provider environment 400 (e.g., using the client's user account credentials) using a computing device 402 to connect to one or more user interfaces provided (e.g., as websites, web applications, command consoles, APIs, etc.) in the environment 400. The user interfaces may enable the client to manage virtual computing resources allocated to the client's account and configured to implement an IoT platform for the client's IoT devices 404.

The computing resource service provider environment 400 may include one or more systems 401 that cooperate to enable deployment of the IoT platform using a customized configuration for a particular user. The systems 401 may include a platform API 412 to which the client, via the user device 130, 132, connects in order to configure, deploy, manage, and otherwise interact with the client's IoT platform. In some embodiments, the platform API 412 provides secure access to an IoT management system 414 that includes or accesses services and data needed to interact with an IoT platform, IoT application 462, and/or IoT devices 404 that are deployed within or connect to the client's virtual computing environment 406, described below. In some embodiments, the IoT management system 414 may access one or more user account data stores 422 that contain user account information and other private information associated with the client's user account. For example, the IoT management system 414 may store and retrieve configuration settings for particular IoT devices 404 and/or IoT applications 462 that the client has previously submitted.

The computing resource service provider implements, within its computing environment 400, at least one virtual computing environment 406 in which users may obtain virtual computing resources that enable the users to run programs, store, retrieve, and process data, access services of the computing resource service provider environment 400, etc. The virtual computing environment 406 may be one of any suitable type and/or configuration of a compute resource virtualization platform implemented on one or more physical computing devices. Non-limiting examples of virtual computing environments 406 include data centers, clusters of data centers organized into zones or regions, a public or private cloud environment, etc. The virtual computing environment 406 may be associated with and controlled and managed by the client. In some embodiments, the virtual computing environment 406 of a particular client may be dedicated to the client, and access by any other user or service of the computing resource service provider environment 400 is prohibited except in accordance with access permissions granted by the client. In some embodiments, an environment API 460 may serve as a front-end interface that provides access to the resources of the virtual computing environment 406 based on whether or not requests to access the environment 406 are authorized. For example, the IoT management system 414 may deploy IoT platform-related resources, push configuration changes, and request information about such resources via calls to the environment API 460. Additionally, or alternatively, other channels, such as TLS-encrypted data channels, may be enabled to allow data to enter or exit the environment 406 without passing through the environment API 460. For example, an IoT application 462 in the environment 406 may be configured to communicate directly with the IoT devices 404 and/or certain services in the computing resource service provider environment 400.

In some embodiments, a client's IoT platform may be deployed by installing one or more IoT applications 462 into the client's virtual computing environment 406. An IoT application 462 may be a software program or suite of software programs including program instructions that enable a processor executing the IoT application 462 to communicate with deployed IoT devices 404, sending and/or receiving data, processing data, and making decisions in accordance with the desired goals and functions of the IoT platform. For example, the IoT application 462 may cause the processor to receive sensor data from the IoT devices 404, process the data to determine whether to take any actions, and then perform any identified action such as reporting the status of connected objects to the client, sending new commands to one or more of the IoT devices 404, storing data (e.g., in an IoT device data store 464), etc. The IoT application may be executed within virtual computing resources allocated to the client's virtual computing environment 406, such as one or more virtual machine instances or logical container instances configured to provide virtualized physical computing resources for the purpose of performing the IoT application's functions. For example, a virtual machine instance may be launched from a software image including the configuration information (e.g., operating system, memory, disk storage, network interface configuration, and software program code) needed to provide an execution environment for the IoT application 462.

The computing resource service provider environment 400 may include data processing architecture that implements systems and services that operate "outside" of any particular user's virtual computing environment and perform various functions, such as managing communications to the virtual computing environments, providing electronic data storage, and performing security assessments and other data analysis functions. These systems and services may communicate with each other, with devices and services outside of the computing resource service provider environment 400, and/or with the virtual computing environments. Services depicted in the figures as inside a particular virtual computing environment 406 or outside all virtual computing environments may be suitably modified to operate in the data processing architecture in a different fashion than what is depicted. The IoT management system 414 may include or communicate with one or more service interfaces 416, such as APIs, that enable the IoT management system 414 and/or other components of a deployed IoT platform (e.g., an IoT application 462) to interact with one or more of these systems and services. Non-limiting examples of provider services that may be invoked or accessed to work in conjunction with the IoT platform include: security services 432 that maintain and apply security policies, access controls, and the like, encrypt and decrypt information, create secure transmission (e.g., TLS) channels, etc.; messaging services 434 that transmit triggering events and other notifications between subscribing users and services, and or/provide queueing services for prioritizing synchronous and asynchronous operations (e.g., API calls); monitoring services 436 that monitor network activity and computing resource usage and generate logs 442 of activity; data storage services 438 that maintain distributed storage devices, databases, etc., and that may maintain and/or obtain data stored in an IoT device data store 464; and, data analytics services 440 that may collect data (e.g., aggregated sensor data) and perform analytics on the data, such as machine learning, trend analysis, general monitoring/alerting, etc.

Figure 5:
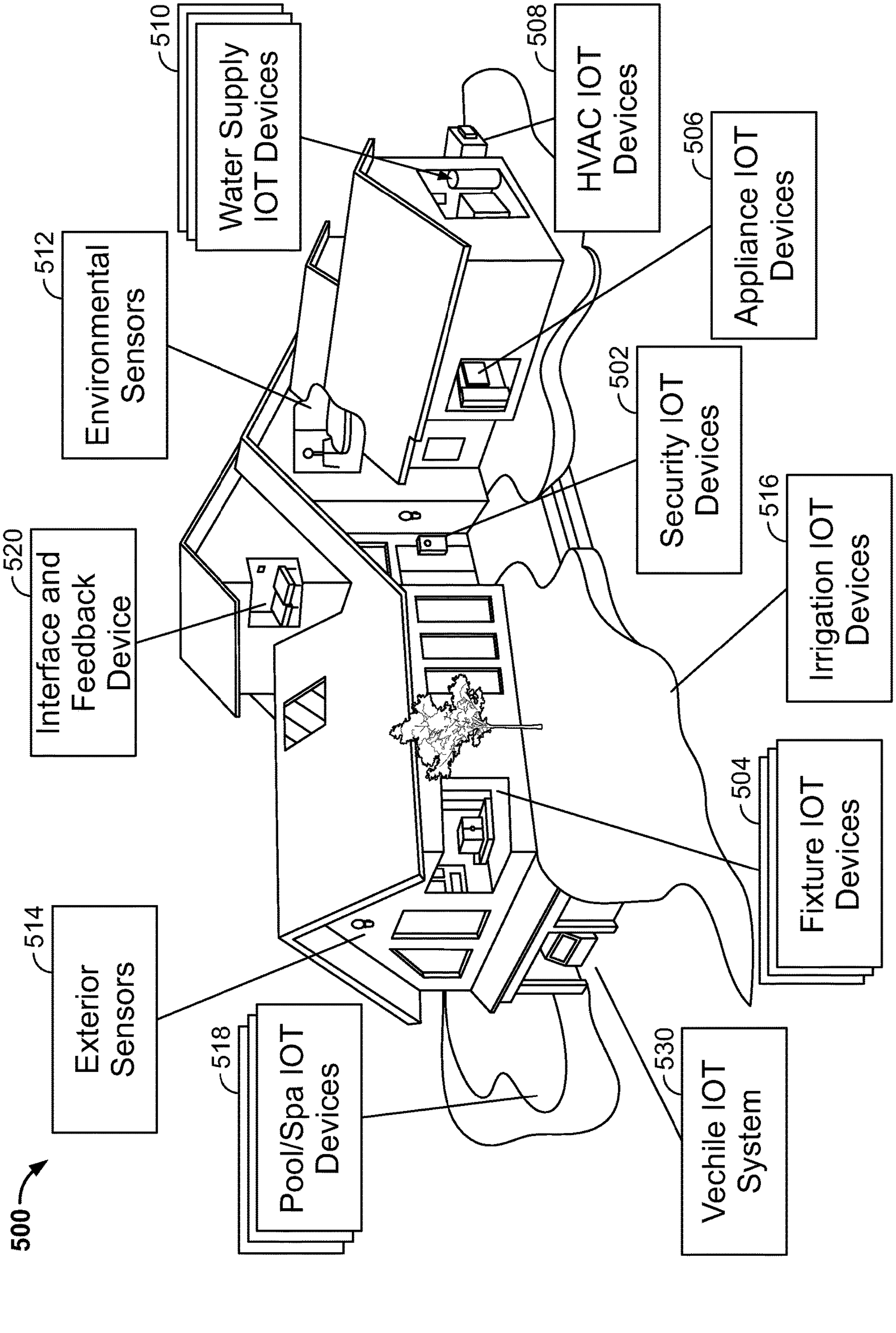
FIG. 5 is a diagram of an example deployment including embodiments of the invention, illustrating a connected residence.

FIG. 5 is a diagram 500 of an example IoT device deployment at a residence in order to create a set of connected objects around the home. The illustrated example IoT devices for connecting to certain objects are not limiting, but are demonstrative of a "smart home" concept where the status can be monitored, and/or operations controlled, for residential devices and systems that historically could only be monitored and controlled manually. Additionally, using the IoT platform described above, together with user interactions and feedback, data from different types of objects and IoT devices may be collected, aggregated, and analyzed to identify previously unknown optimizations, synergies, impacts, and cooperative functionalities between objects in the home. In the illustrated example, the IoT devices may be natively included as a component of the corresponding connected object, or may be retroactively connected (e.g., via sensors and control interfaces as described above) to an unconnected object to connect that object to the IoT platform.

Non-limiting example IoT devices in the diagram 500 include: security IoT devices 502 that monitor home activity, such as smart doorbells, indoor and outdoor video cameras, security/alarm systems, etc.; fixture IoT devices 504 for connecting to "analog" home fixtures, such as faucets and other plumbing; appliance IoT devices 506 for connecting to in-home appliances such as televisions, washers and dryers, refrigerators, dishwashers, garbage disposals, coffee makers, etc.; HVAC IoT devices 508 for connecting to air conditioning units, heating units, vents, etc.; water supply IoT devices 510 for connecting to water heaters, water softeners, water filtration systems, water and sewer pipes, sump pumps and other water pumps, etc.; interior environmental sensor devices 512 such as motion detectors, light detectors, sound detectors, smoke detectors, carbon monoxide detectors, thermostats, etc.; exterior sensor devices 514 such as light and motion detectors, rain sensors, wind sensors, etc.; irrigation IoT devices 516 for connecting to watering system control panels, valves, water lines, areas of earth/soil, etc.; and, pool and spa IoT devices 518 for connecting to pool controls, pool pumps, pool lights, the pool/spa itself, etc. Some or all of the IoT devices 502-518 may collect and send data to a gateway, router, or base station in the home, or directly to a cloud-based server; configuration and control commands may be transmitted in the opposite direction.

The deployment may further include one or more IoT platform interface/feedback devices 520, such as a resident's desktop PC or smartphone having software or a browser interface executing thereon to access the IoT platform and monitor, configure, control, add, remove, change, and perform other management operations on the IoT devices 502-518 and/or interact with collected and analyzed data. The IoT platform may further include a vehicle IoT system 530 installed in the resident's vehicle. In some embodiments, the installation may include a user interface similar to that of the feedback device 520, installed on a computer of the vehicle and presented, e.g., on a navigation screen or another display device. Additionally, or alternatively, the vehicle IoT system 530 may include one or more IoT devices that monitor and/or control various properties of the vehicle, such as motor speed and temperature, fuel/battery level, interior temperature, ignition, etc.

Figure 6:
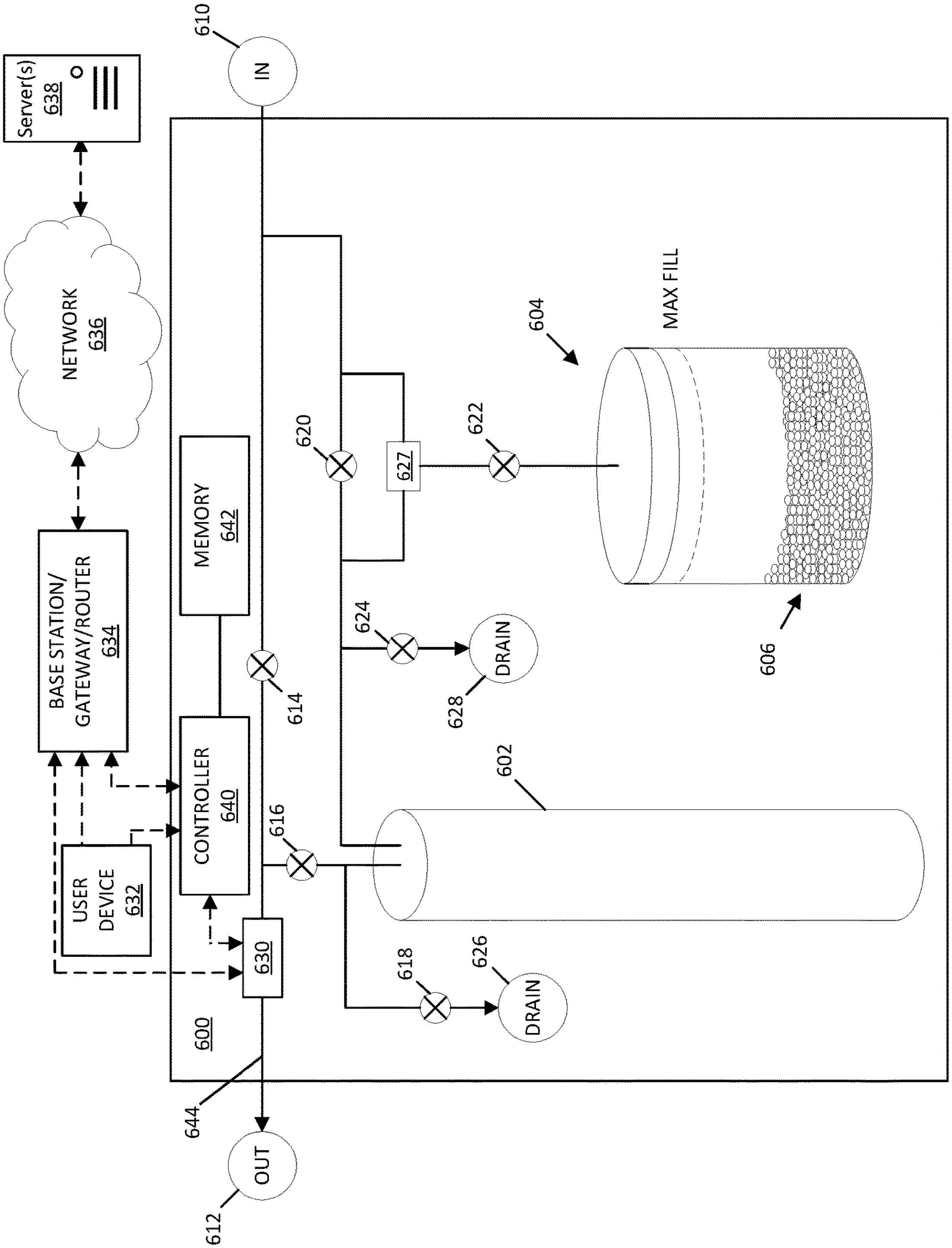
FIG. 6 is a block diagram of an example embodiment of a water softener system.

FIG. 6 shows an illustrative water softener system 600 (sometimes referred to herein as the "water softener 600" or the "system 600") that includes a softening tank 602, a brine tank 604, and valves 614, 616, 618, 620, 622, and 624, as well as electronic devices and networks that may communicate with or facilitate communication with one or more components of the water softener system 600. The valves 614, 616, 618, 620, 622, and 624 may be selectively opened and closed based on signals received from a controller 640, which executes computer-readable instructions stored on a non-transitory computer-readable memory device 642 (sometimes referred to herein as "memory 642") to control the valves. The water softener system 600 may also include a flow meter 630 at its output. The flow meter 630 may be communicatively coupled, via a wired or wireless connection, to either or both of the controller 640 or a base station/gateway/router 634. The controller 640 may be communicatively coupled, via a wired or wireless connection, to either or both of the base station/gateway/router 634 and a user device 632, which may be a personal computer, tablet, or smart phone, for example. The user device 632 may be wirelessly, communicatively coupled to the base station/gateway/router 634. Additionally, the user device 632 may be communicatively coupled to the controller 640 (e.g., coupled directly to the controller 640 via a wireless PAN connection such as Bluetooth®, coupled directly to the controller 640 via a Wi-Fi direct connection, coupled to the controller 640 via a wired or wireless connection to the base station/gateway/router 634, and/or coupled to the controller 640 via a wired connection such as a serial or Ethernet connection). The base station/gateway/router 634 may be connected to a network 636, which may be a WAN or the internet, for example. Via its connection to the network 636, the base station/gateway/router 634 may be communicatively coupled to one or more servers 638, which may be remote from the local network(s) to which the base station/gateway/router 634 is connected. It should be understood that the configuration of components of the water softener 600 is intended to be illustrative and not limiting. If desired, the methods described herein (e.g., in connection with FIGS. 7 and 8) may be performed in connection with other applicable water softener configurations.

During operation, hard water is delivered to the system 600 through an inlet line 610 and treated water (sometimes referred to herein as "soft" or "softened" water) is output by the system 600 through an outlet line 612. The valve 614 is interposed between the inlet line 610 and the outlet line 612 and may be normally closed. The valve 616 is interposed between the softening tank 602 and the outlet line 612 and may be normally open. The valve 618 is interposed between the softening tank 602 and a drain line 626, and may be normally closed. The valve 624 is interposed between a drain line 628 and the outputs of both the valve 620 and the injector 627, and is normally closed. Hard water may normally be delivered to the softening tank 602 through the valve 620, which is interposed between the inlet line 610 and the softening tank 602 and which may be normally open.

The softening tank 602 may, in cooperation with the brine tank 604, use any suitable water softening technology to produce the treated water from the hard water. For example, the softening tank 602 can include a bed (sometimes referred to herein as a "resin bed") of ion exchange resin particles. Binding sites in the resin bed initially contain positive ions, commonly unipositive sodium or potassium ions. As hard water enters the resin, competition for the binding sites occurs. The di-positive and tri-positive ions in the hard water are favored due to their higher charge densities and displace the unipositive ions. Two or three unipositive ions are displaced for each di-positive or tri-positive ion, respectively.

When enough unipositive ions have been displaced from the resin bed, it must be regenerated to resume softening hard water. The regeneration process may include a backwash step, a brining step, and a rinsing step. During the backwash step, the valves 620 and 622 may be closed, while the valves 614 and 624 are opened. Hard water from the inlet line 610 may feed through the open valve 616 into the softening tank 602, and may be forced through the resin bed to exit through the drain line 628. During the brining step, hard water entering the softening tank 602 may pass through an injector 627 to draw a salt solution (sometimes referred to as brine) from the brine tank 604 when the valve 622, which is interposed between the brine tank 604 and the injector 627, is opened and the valve 620 is closed.

The brine tank 604 may be filled with a salt 606, which may be sodium chloride or potassium chloride, for example. The brine tank may include a "MAX FILL" line, which may indicate to a user the maximum amount of salt that should be added when a user is refilling the brine tank with salt. Water in the brine tank 604 may mix with the salt 606 to form a brine, which, when withdrawn, is delivered to the softening tank 602 through the valve 622 and the injector 627. When drawn into the softening tank 602, the brine passes through the resin bed of the softening tank 602 and is output through the valve 618 to the drain line 626. As the brine passes through the resin bed, it replaces di-positive and tri-positive ions in the resin with unipositive ions, to regenerate the resin bed.

During the rinsing step, the brine tank 604 is refilled with water and the resin bed is purged by opening the valves 620, 622, and 618 while the valves 616 and 624 are closed. Hard water may then enter the brine tank 604 through the open valve 622 and may enter the softening tank 602 through the valve 620. Water passing through the softening tank 602 then exits through the drain 626. After the rinsing step, the regeneration of the resin bed is complete, and the valves 614, 618, 624, and 622 may be closed, while the valves 616 and 620 are opened to return the water softening system 600 to a normal operation.

Over time, the level of the salt 606 in the brine tank 604 may lower through repeated regeneration of the resin bed, as the salt 606 is gradually used up in the creation of brine. If the salt 606 of the brine tank 604 is allowed to run out entirely, the water softener system 600 will no longer be able to effectively regenerate the resin bed. It may therefore be desirable to estimate when the salt level in the brine tank 604 falls below a predefined threshold (e.g., based on the amount of salt needed to perform a regeneration operation) so that a home or business owner associated with the system 600 may refill the brine tank 604 with salt (e.g., before the salt 606 is completely consumed).

The flow meter 630 may be disposed in an outlet pipe 644 (e.g., the pipe leading to the outlet line 612, following the junction between valves 614 and 616, as shown) or interposed between two sections of such the outlet pipe 644. The flow meter 630 may detect the flow rate of fluid passing through the outlet pipe 644 and may generate corresponding flow rate data. Water usage data (sometimes referred to herein as "softened water usage data") that reflects the total amount of softened water used in the plumbing system of the building, of which the water softener 600 is a part, over specified time periods, may be generated based on this flow rate data. For example, water usage data may define the total amount of softened water output by the water softener 600 each minute, hour, day, week, month, and/or year. The water usage data may further define water usage over one or more windows of time (e.g., weekly water usage over one year, daily water usage over one week, hourly water usage over one day, etc.). For example, the flow meter 630 may send generated flow rate data to the controller 640, which may store the flow rate data in the memory 642, and which may generate water usage data based on the stored flow rate data. Alternatively, the flow meter 630 may send generated flow rate data to the server(s) 638 via a data path that includes the controller 640, the base station/gateway/router 634, and the network 636 as nodes. The servers 638 may store the flow rate data and generate water usage data based on the stored flow rate data. In some embodiments, the controller 640 may store the flow rate data locally in the memory 642, and may periodically (e.g., hourly, daily, weekly, etc., according to a predefined or user-defined schedule) update the flow rate data stored at the server(s) 638. In some embodiments, the water usage data may be generated by the controller 640 or by the server(s) 638 in response to a request from the user device 632.

A processor (e.g., of the controller 640, of the server(s) 638, or of the user device 632) may determine an estimated amount of time (e.g., a maximum number of days) that can elapse after a regeneration of the water softener system 600 until another regeneration operation should be performed to regenerate the resin bed. The result of this estimate may be stored in memory (e.g., the memory 642, a memory of the user device 632, or a memory of the server(s) 638), and may be referred to as an "estimated period between regenerations", "estimated period between regenerations value", or "$P_R$". In some embodiments, this estimate is made based on the water usage data, while, in other embodiments, this estimate is made based on a defined water softener regeneration schedule. The basis for determining the estimated period between regenerations may be selected by the processor based on a defined system configuration type.

For example, a first system configuration type may correspond to an embodiment of the water softener 600 that does not include the flow meter 630 or for which the flow meter 630 is not activated. For the first system configuration type, the estimated period between regenerations may be defined strictly based on a user-defined regeneration schedule.

For example, a second system configuration type may correspond to an embodiment of the water softener 600 that includes the flow meter 630 and that is configured to perform regeneration immediately in response to determining that the estimated period between regenerations has elapsed. For the second system configuration type, the estimated period between regenerations may be calculated as a first quantity divided by a second quantity. The first quantity may be calculated as a unit capacity (e.g., corresponding to the maximum amount of hard ions that may be removed from water by the resin bed before regeneration of the resin bed is needed—for example, this may be 30,000 grains or 1,000 grams of hardness) divided by a water hardness value (e.g., which may be manually input by a homeowner or a technician after testing the hardness of the water being input to the water softener 600).

The second quantity may be defined as an average water use over a predefined period (e.g., average daily water use, averaged over a period of one week or one month), which may be determined based on the water usage data derived from the flow rate data of the flow meter 630. For example, the resin bed may have a maximum capacity quantified as a predetermined volume of softened water that can be output by the water softener system immediately following regeneration until the resin bed has been saturated with hard water ions and needs to be regenerated again. The remaining capacity of the resin bed may be calculated by the processor by subtracting the amount of softened water output by the water softener system (e.g., determined based on the water usage data derived from the flow rate data generated by the flow meter 630 of FIG. 6) from the maximum capacity of the resin bed. For the second configuration type, when the remaining capacity of the resin bed reaches zero, the water softener system may automatically initiate a regeneration cycle.

For example, a third system configuration type may correspond to an embodiment of the water softener 600 that includes the flow meter 630 that is configured to perform regeneration at a scheduled time following the determination that the estimated period between regenerations has elapsed, and that is configured to reserve a portion of the resin bed capacity (e.g., the last 20%) to cover the amount of time that regeneration may need to be delayed in order to be performed at a scheduled regeneration time. For example, in the third system configuration, the controller 640 may assert a flag (e.g., a regeneration flag) in the memory 642 in response to determining that the remaining resin bed capacity is depleted beyond a predetermined threshold (e.g., that the remaining capacity of the resin bed is at 20% of the maximum resin bed capacity). For the third system configuration type, the estimated period between regenerations may be calculated as a first quantity divided by a second quantity. The first quantity may be calculated by dividing the unit capacity by a water hardness value, then subtracting a predefined portion of the resin bed capacity (e.g., 20%). The second quantity may be defined as an average water use over a predefined period, as described above, which may be determined based on the water usage data derived from the flow rate data of the flow meter 630.

In some embodiments, the estimated period between regenerations may be recalculated each time a regeneration operation of the water softener 600 is performed so that changes in water usage may be taken into account. As another example, the estimated period between regenerations may be periodically recalculated (e.g., hourly, daily, weekly) according to a defined schedule. In some embodiments, if insufficient water usage data is available, the processor may set the estimated period between regenerations to a default value (e.g., four days).

The processor may determine an estimate of the amount of salt remaining in the brine tank 604. The result of this estimate may be stored in memory (e.g., the memory 642, a memory of the user device 632, or a memory of the server(s) 638) and may be referred to as the "estimated salt remaining" or the "estimated salt remaining value". For example, each time a user adds salt to the brine tank 604, the user may provide an "amount added" the brine tank 604 via a "salt remaining" screen of a user interface of the user device 632, which may cause the processor to update the estimated salt remaining by summing the user-defined "amount added" with the current estimated salt remaining. It should be understood that any "user interface" described in connection with the user device 632 may be displayed on an electronic screen of the user device 632, which may be a capacitive or otherwise touch-sensitive screen in some embodiments.

In some embodiments, the user may want to decrease the estimated salt remaining (e.g., if the user previously provided an erroneous "amount added" via the user interface, or if the user believes the estimated salt remaining to be erroneous), in which case they may provide an "amount reduced" by which to reduce the estimated salt remaining via the user interface of the user device 632. In such embodiments, the processor may update the estimated salt remaining by subtracting the user-defined "amount reduced" from the current estimated salt remaining.

In some embodiments, upon accessing the "salt remaining" screen of the user interface (e.g., prior to displaying options to provide an "amount added" or an "amount reduced"), the user device 632 may generate and display a prompt to the user, the prompt providing the user with a number of selectable options, each including a different qualitative description of the amount of salt remaining in the brine tank 604. For example, a first option of the prompt may state "I'm not ready for a salt refill." This is intended to be illustrative and not limiting. It should be understood that in some embodiments, another applicable statement may be displayed via the prompt that qualitatively conveys that a sufficient amount of salt in the brine tank 604. The user may select the first option if a water level in the brine tank 604 is not above the salt level in the brine tank 604. For example, a second option of the prompt may state "I can see water above my salt." The user may select the second option if a water level in the brine tank 604 is above the salt level in the brine tank 604. For example, a third option of the prompt may state "I'm out of salt." The user may select the third option if no salt is visible in the brine tank 604. The selected option may be sent to the processor, which may revise the estimated salt remaining based on the selected option under certain conditions.

For example, in response to the selection of the first option, and a determination by the processor that the estimated number of regenerations remaining (see below) is less than a predetermined threshold (e.g., 8), the processor may increase the estimated salt remaining. As an illustrative example, the amount by which the estimated salt remaining is increased may be defined as the lower of two values. The first of the two values may be defined as salt_dosage*resin_volume*8.6/2, where salt_dosage corresponds to a predefined amount of salt that is expected to be used during a regeneration operation, and where resin_volume corresponds to a predefined volume of the resin bed of the water softener 600. The second of the two values may be a predefined constant (e.g., 80 lb.).

For example, in response to the selection of the second option, and a determination by the processor that the estimated number of regenerations remaining is greater than a predetermined threshold (e.g., 8), the processor may decrease the estimated salt remaining. As an illustrative example, the amount by which the estimated salt remaining is decreased may be defined as the lower of two values. The first of the two values may be defined as salt_dosage*resin_volume*8.6/2, where salt_dosage corresponds to a predefined amount of salt that is expected to be used during a regeneration operation, and where resin_volume corresponds to a predefined volume of the resin bed of the water softener 600. The second of the two values may be a predefined constant (e.g., 80 lb.).

For example, in response to the selection of the third option, the processor may set the estimated salt remaining to zero.

Additionally, each time a regeneration operation of the water softener 600 is performed, the estimated salt remaining may be reduced by a predefined salt dosage corresponding to the amount of salt that is expected to be used during a regeneration operation. In some embodiments, the salt dosage may be variable, allowing a user or technician to adjust the amount of salt that is used in each regeneration operation.

The processor may determine an estimate of the number of regenerations that may be performed for the water softener 600 before the brine tank 604 would need to be refilled due to the estimated salt remaining in the brine tank 604 being insufficient to perform additional regenerations. The result of this estimate may be stored in memory (e.g., the memory 642, a memory of the user device 632, or a memory of the server(s) 638) and may be referred to as an "estimated number of regenerations remaining" or "$N_R$". For example, the estimated number of regenerations remaining may be calculated by dividing the estimated salt remaining by a predefined salt dosage corresponding to the amount of salt expected to be used during a single regeneration operation, which may be dependent on the volume of the resin bed. The estimated number of regenerations may be recalculated/updated each time the estimated salt remaining is updated. When the estimated number of regenerations remaining reaches zero, the processor may cause an alert to be sent to the user device 632, indicating that the salt in the brine tank 604 should be refilled. In some embodiments, intermediate alerts may also be sent before the estimated number of regenerations remaining reaches zero. For example, the controller 640 may determine that $N_R*P_R$ (sometimes referred to as the estimated time until salt refill, as described below) is less than a specified time period (e.g., indicating that the brine tank 604 will need to refilled in less than 14 days) and, in response, may cause a non-critical alert to be sent to the user device 632 indicating that the salt in the brine tank 604 should be refilled with salt soon. For example, the controller 640 may determine that $N_R*P_R$ is less than 7 and, in response, may cause a critical alert to be sent to the user device 632 indicating that the salt in the brine tank should be refilled with salt very soon.

The processor may determine an estimate of the time remaining until the resin bed of the water softener 600 is expected to be depleted (e.g., to be in need of regeneration). The result of this estimate may be stored in memory (e.g., the memory 642, a memory of the user device 632, or a memory of the server(s) 638) and may be referred to as an "estimated time until depletion" or "$t_D$". For example, the processor may monitor the amount of time that has elapsed since the occurrence of the most recent regeneration, may determine the estimated time until depletion by subtracting this elapsed time from the estimated period between regenerations. The estimated time until depletion may be sent to the user device 632 and displayed on a user interface thereof. In this way, the user may be provided with an estimate of when the next regeneration of the water softener 600 will occur. It should be understood that the actual initiation of a regeneration cycle of the water softener 600 may be initiated by the controller 640 based on the monitored remaining capacity of the resin bed.

The processor may determine an estimated amount of time (e.g., number of days) remaining until the brine tank 604 will need to be refilled with salt. The result of this estimate may be stored in memory (e.g., the memory 642, a memory of the user device 632, or a memory of the server(s) 638) and may be referred to as an "estimated time until salt refill" or "$t_{SR}$". In some embodiments, the estimated time until salt refill may be updated any time the estimated period between regenerations is updated and/or any time the estimated salt remaining is updated (e.g., based on user input via the user device 632). For example, immediately following a regeneration of the estimated time until salt refill may be defined as $t_{SR}=P_R*N_R$ (i.e., the product of the estimated period between regenerations and the estimated number of regenerations remaining). As another example, the estimated time until salt refill may be periodically updated (e.g., once per hour, day, etc.) as $t_{SR}=t_D+(P_R*(N_R-1))$.

In some embodiments, the user interface of the user device 632, in addition to allowing the user to alter the estimated salt remaining, may display information about the water softener 600, which may include the estimated salt remaining, the estimated time until salt refill, the estimated period between regenerations, the estimated number of regenerations remaining, the flow rate data, and/or the water usage data, for example.

Figure 7:
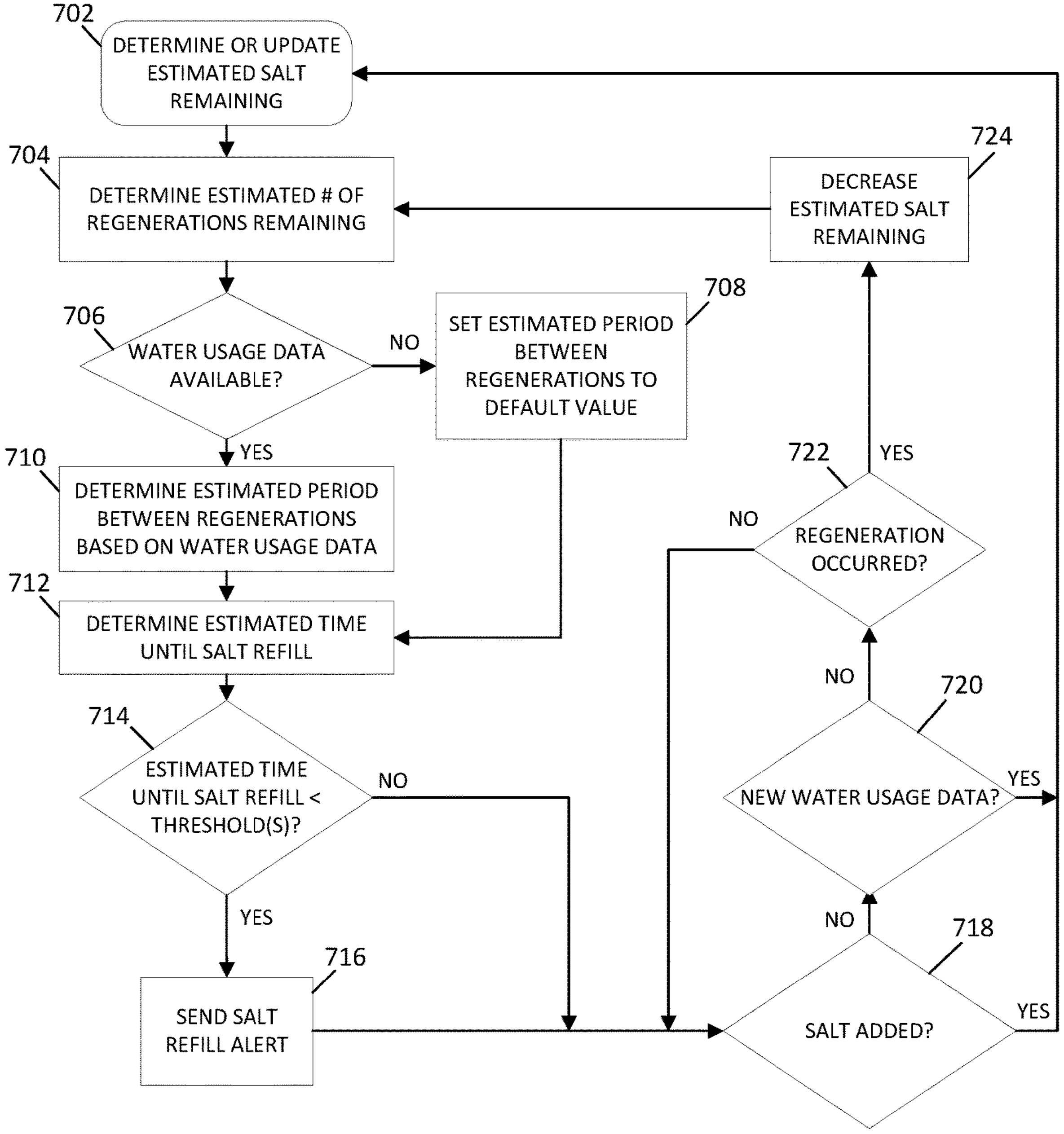
FIG. 7 is an illustrative flow chart of an example embodiment of a method for determining when salt in a brine tank of a water softener system should be refilled.

FIG. 7 shows a method by which a processor (e.g., of the user device 632, the controller 640, or the server(s) 638 of FIG. 6) may determine when regeneration of a water softener system (e.g., water softener system 600 of FIG. 6) should be performed, and when the salt in a brine tank of the water softener system should be refilled by determining estimated parameters of the water softener system, which may include an estimated number of regenerations remaining, an estimated salt remaining, an estimated period between regenerations, an estimated time until salt refill and/or an estimated time until depletion.

At step 702, the processor determines a value of "estimated salt remaining", which may correspond to an estimate of the amount of salt remaining in a brine tank (e.g., brine tank 604 of FIG. 6) of the water softener system. For example, the estimated salt remaining may be determined or updated based on user input received from a user device (e.g., according to the method of FIG. 8).

At step 704, the processor determines a value of "estimated number of regenerations remaining", which may correspond to an estimate of the number of regenerations that can be performed by the water softener system before the salt tank needs to be refilled.

At step 706, the processor determines whether water usage data (e.g. derived from the flow rate data generated by the flow meter 630 of FIG. 6) is available and sufficient to determine an estimated period between regenerations based on the water usage data. For example, the processor may determine whether average daily water usage data is available (e.g., in a memory device in communication with the processor) for more than a predetermined time period (e.g., two weeks, one month, or another applicable time period), the predetermined time period here defining the lower end of an illustrative range of a "sufficient" amount of water usage data. If sufficient water usage data is available, the method proceeds to step 710. If sufficient water usage data is not available, the method proceeds to step 708.

At step 708, in response to determining that sufficient water usage data is not available, the processor sets the estimated period between regenerations to a default value (e.g., four days) which may correspond to a user-defined regeneration schedule. In some embodiments (e.g., corresponding to the first system configuration type described previously), this default value may be set based on a defined (e.g., user-defined, technician-defined, etc.) regeneration schedule for the water softener system. Here, the estimated period between regenerations corresponds to an estimate of the maximum amount of time that should elapse between consecutive regenerations of the water softener system. The estimated period between regenerations may be used as a basis for predicting when the next regeneration of the water softener system will be performed. As indicated previously, the actual regeneration operation may be triggered based on flow meter data monitored by the controller of the water softener system.

At step 710, in response to determining that sufficient water usage data is available, the processor determines the estimated period between regenerations based on the water usage data. For example, depending on a system configuration type of the water softener system, the processor may set the estimated period between regenerations based on water usage data as defined above (e.g., in connection with either the second or the third system configuration types).

At step 712, the processor determines an estimated time until salt refill (e.g., number of days) remaining until the brine tank (e.g., brine tank 604 of FIG. 6) will need to be refilled with salt. The result of this estimate may be stored in memory (e.g., the memory 642, a memory of the user device 632, or a memory of the server(s) 638 of FIG. 6). In the present example, it is assumed that little or no time has passed since the most recent regeneration when step 712 is performed, so the estimated time until salt refill may be defined as $t_{SR}=P_R*N_R$ (i.e., the product of the estimated period between regenerations and the estimated number of regenerations remaining). The value of $t_{SR}$ may be updated periodically (e.g., every day, hour, minute, or second), and may be displayed via a user interface of the user device. In this way, a user may be informed of the estimated amount of time remaining until they will need to refill the brine tank of the water softener with salt.

At step 714, the processor determines whether the estimated time until salt refill is equal to or has fallen below one or more predetermined thresholds. For example, an "intermediate" threshold may be set as 14 days, a "critical" threshold may be set as 7 days, and an "empty" threshold may be set as 0 days. If so, the method proceeds to step 716. Otherwise, the method proceeds to step 718.

At step 716, the processor causes an alert (e.g., a "salt refill" alert) to be sent to one or more electronic devices associated with the water softener system. The alert may indicate that salt should be added to the brine tank of the water softener system. For example, the processor may determine that the estimated time until salt refill (e.g., $N_R*P_R$) is less than 14 days and, in response, may cause a non-critical alert to be sent to the electronic device indicating that the salt in the brine tank should be refilled with salt soon. For example, the processor may determine that $N_R*P_R$ is less than 7 days and, in response, may cause a critical alert to be sent to the electronic device indicating that the salt in the brine tank should be refilled with salt very soon. For example, the processor may determine that $N_R*P_R$ is 0 and, in response, may cause an alert to be sent to the electronic device indicating that there is no salt remaining in the brine tank. In some embodiments, the electronic device may be a user device (e.g., user device 632, FIG. 6) such as a tablet, smart phone, or personal computer, and the alert sent via the processor may be a push notification, a text message, and/or an e-mail, for example. In some embodiments, the electronic device may be a server (e.g., server(s) 638 of FIG. 6) associated with a water softener maintenance service, and the alert may cause the server to automatically schedule a maintenance request/appointment for the brine tank to be refilled with salt. For example, the maintenance request/appointment may be scheduled at a date/time that occurs sooner than a length of time equal to the estimated period between regenerations, which may aid in ensuring that salt is added to the brine tank before the next regeneration needs to occur. In some embodiments, the electronic device may include one or more flashing lights and/or audible alarms (e.g., in the vicinity of the water softener system or the associated home/business) that are activated in response to the alert.

At step 718, the processor determines whether salt has been added to the brine tank (e.g., in response to user input provided via an electronic device such as the user device 632 of FIG. 6). If salt has been added to the brine tank, the method returns to step 702 and recurs. Otherwise, the method proceeds to step 720.

At step 720, the processor determines whether new water usage data is available (e.g., based on flow meter data generated from a smart flow meter such as the flow meter 630 of FIG. 6). If so, the method returns to step 702 and the method recurs. Otherwise, the method proceeds to step 722.

At step 722, the processor determines whether a regeneration of the water softener system has occurred. If so, the method proceeds to step 724. Otherwise, the method returns to step 718. As shown, steps 718, 720, and 722 may form a repeating loop in which the processor essentially waits until either salt has been added to the brine tank, new water usage data is available, or regeneration of the water softener system has occurred.

At step 724, the estimated salt remaining in the brine tank is reduced following the regeneration of the water softener system. For example, the estimated salt remaining may be reduced by an amount corresponding to an estimated amount of salt used during the regeneration operation. The method may then return to step 704 to update the estimated number of regenerations based on the change in the estimated salt remaining.

In the above example, prompts and alerts displayed at the user device may be generated by the remote server and sent to the user device, or may be generated by a software application running on the user device in response to instructions received from the remote server or stored on a local memory device of the user device.

Figure 8:
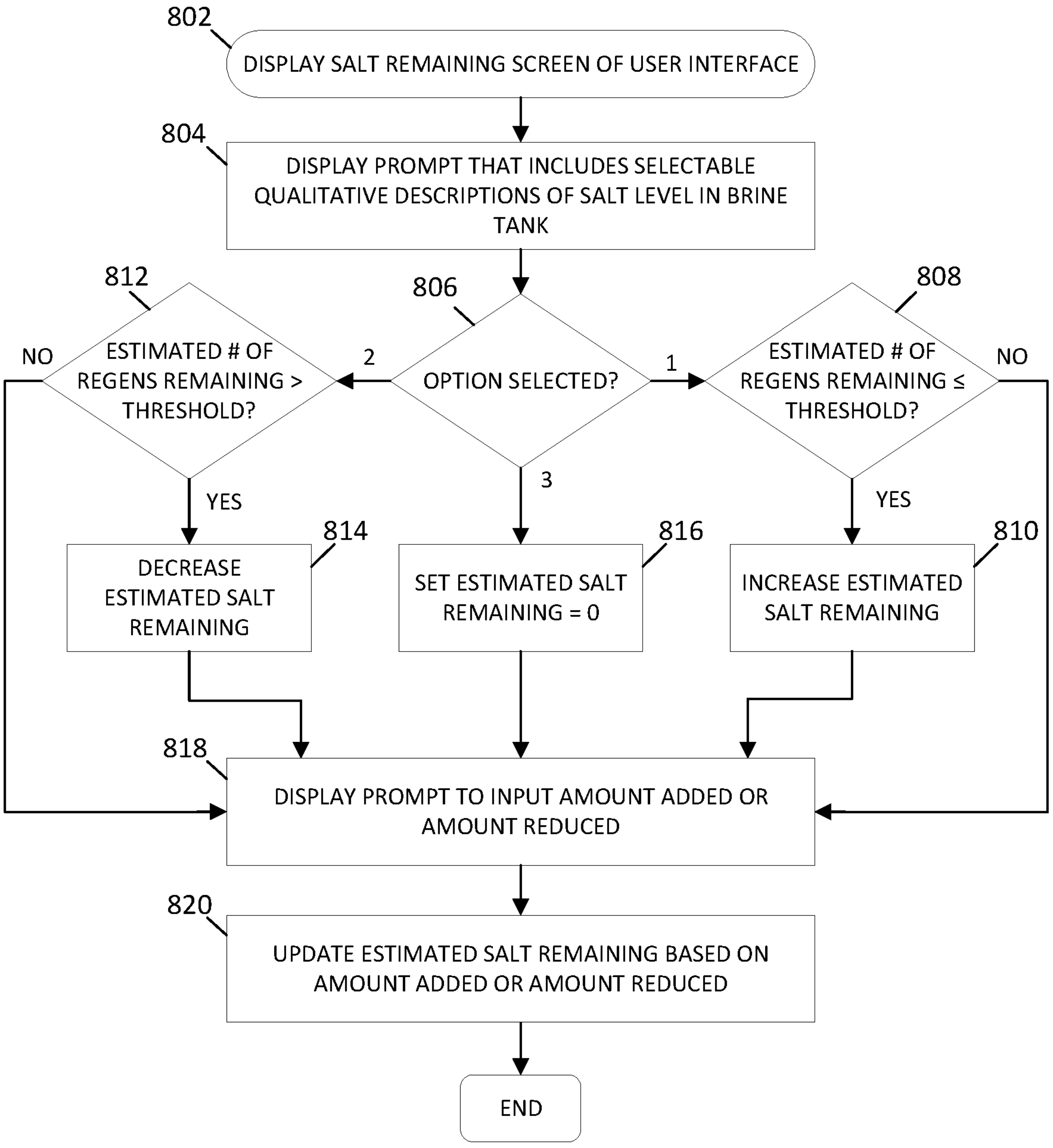
FIG. 8 is an illustrative flow chart of an example embodiment of a method for acquiring qualitative and/or quantitative information related to the amount of salt that is in a brine tank of a water softener system.

FIG. 8 shows a method by which a processor (e.g., of the user device 632, the controller 640, or the server(s) 638 of FIG. 6) may cause one or more prompts to be displayed on an electronic screen of a user interface (e.g., via a salt remaining screen of the user interface) of an electronic device (e.g., the user device 632 of FIG. 6), the prompts allowing a user to provide qualitative and/or quantitative information related to the amount of salt that is in the brine tank of a water softener system (e.g., brine tank 604 of water softener system 600 of FIG. 6).

At step 802, the processor causes a salt remaining screen to be displayed as part of a user interface shown on an electronic screen of the electronic device. In some embodiments, the user interface may display information about the water softener 600, which may include the estimated salt remaining, the estimated time until salt refill, the estimated period between regenerations, the estimated number of regenerations remaining, the flow rate data, and/or the water usage data, for example, along with at least one selectable navigation icon by which the use may select to cause the salt remaining screen to be shown via the user interface.

At step 804, the processor causes a prompt to be displayed on the salt remaining screen that includes multiple selectable qualitative descriptions of the salt level in the brine tank (e.g., as observed by the user responding to the prompt). A first option of the prompt may correspond to a water level in the brine tank being below the salt level in the brine tank. For example, the first option may include the text "I'm not ready for a salt refill." A second option of the prompt may correspond to a water level in the brine tank being above the salt level in the brine tank. For example, the second option may include the text "I can see water above my salt." A third option of the prompt may correspond to no salt being present/visible in the brine tank. For example, the third option may include the text "I'm out of salt." The selected option may be sent to the processor, which may revise the estimated salt remaining based on the selected option under certain conditions, as will be described.

At step 806, the processor determines which of the three options provided via the prompt was selected. If the first option was selected, the method proceeds to step 808. If the second option was selected, the method proceeds to step 812. If the third option was selected, the method proceeds to step 816.

At step 808, the processor determines whether an estimated number of regenerations remaining (described above) stored in a memory device in communication with the processor is less than or equal to a predetermined threshold (e.g., which may correspond to the number of regenerations remaining when the salt level is at or near the water level in the brine tank). For example, since the first option is indicative of a relatively large amount of salt being present in the brine tank, the estimated salt remaining in the brine tank may need to be increased if the estimated number of regenerations remaining (which is calculated based on the estimated salt remaining) is indicative of a relatively low amount of salt being present in the brine tank. If the estimated number of regenerations is less than or equal to the threshold, the method proceeds to step 810. Otherwise, the method proceeds to step 818.

At step 810, the processor increases the value of the estimated salt remaining. The amount by which the estimated salt remaining is increased may be based on at least the expected amount of salt used in each regeneration and a volume of the resin bed of the water softener system. As an illustrative example, the amount by which the estimated salt remaining is increased may be defined as the lower of two values. The first of the two values may be defined as salt_dosage*resin_volume*8.6/2, where salt_dosage corresponds to a predefined amount of salt that is expected to be used during a regeneration operation, and where resin_volume corresponds to a predefined volume of the resin bed of the water softener 600. The second of the two values may be a predefined constant (e.g., 80 lb.).

At step 812, the processor determines whether an estimated number of regenerations remaining (described above) stored in a memory device in communication with the processor is greater than a predetermined threshold (e.g., 8). For example, since the second option is indicative of a relatively low amount of salt being present in the brine tank, the estimated salt remaining in the brine tank may need to be decreased if the estimated number of regenerations remaining (which is calculated based on the estimated salt remaining) is indicative of a relatively large amount of salt being present in the brine tank. If the estimated number of regenerations exceeds the threshold, the method proceeds to step 814. Otherwise, the method proceeds to step 818.

At step 814, the processor decreases the value of the estimated salt remaining. The amount by which the estimated salt remaining is decreased may be based on at least the expected amount of salt used in each regeneration and a volume of the resin bed of the water softener system. As an illustrative example, the amount by which the estimated salt remaining is decreased may be defined as the lower of two values. The first of the two values may be defined as salt_dosage*resin_volume*8.6/2, where salt_dosage corresponds to a predefined amount of salt that is expected to be used during a regeneration operation, and where resin_volume corresponds to a predefined volume of the resin bed of the water softener 600. The second of the two values may be a predefined constant (e.g., 80 lb.).

At step 816, the processor sets the estimated salt remaining to zero, as the third option is indicative of minimal or no salt being present in the brine tank.

At step 818, the processor causes a prompt to be displayed on the salt remaining screen of the user interface, the prompt allowing an "amount added" or an "amount reduced" to be defined. The "amount added" may correspond to a user-defined amount of salt that has been added to the brine tank. The "amount reduced" may correspond to a user-defined amount by which the estimated salt remaining should be reduced (e.g., to correct a mistake in a previously submitted "amount added").

At step 820, the processor receives the "amount added" or the "amount reduced" provided via the user interface in response to the prompt, and updates the estimated salt remaining accordingly.

In the above example, prompts displayed at the user device may be generated by the remote server and sent to the user device, or may be generated by a software application running on the user device in response to instructions received from the remote server or stored on a local memory device of the user device.

FIGS. 9A-9D shows an illustrative method by which a controller or server processor (e.g., of the controller 640, or the server(s) 638 of FIG. 6) may periodically determine an estimated time until the next regeneration cycle of a water softener system (e.g., system 600 of FIG. 6) will be initiated. This estimated time may be quantified via an "estimated time until next regeneration" value that is set via this method. For example, the estimated time until next regeneration value may be displayed on a user interface of a client device (e.g., displayed on the user interface of the user device 632 of FIG. 6). The processor may perform the method by executing computer-readable instructions stored on a memory device (e.g., memory 642 of FIG. 6; a memory of the servers 638 or of the user device 632 of FIG. 6) coupled to the processor.

Figure 9A:
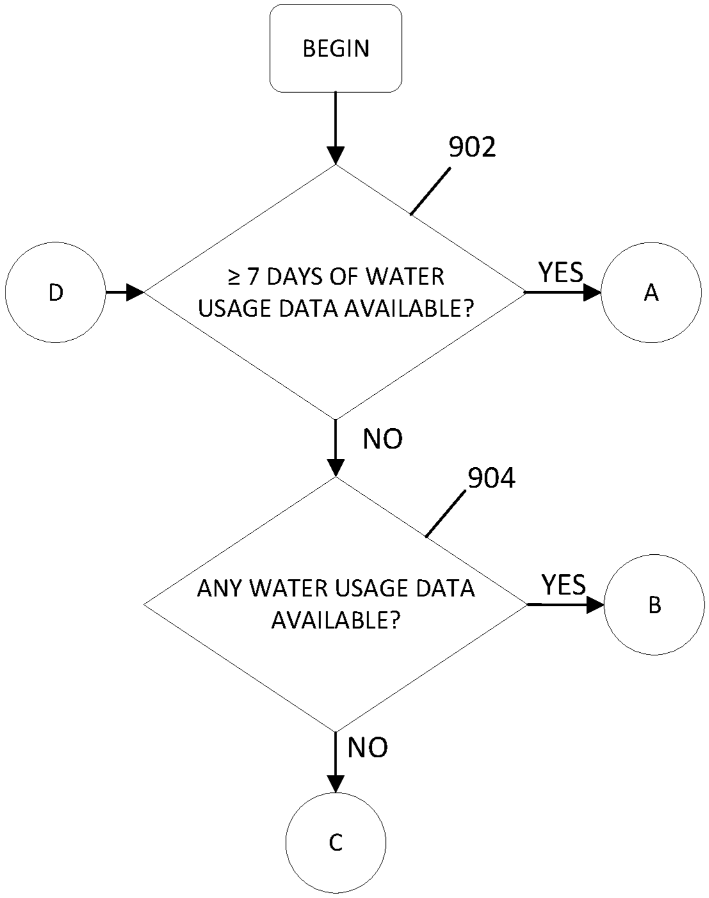
FIGS. 9A-9D show illustrative flow charts of an example embodiment of a method for estimating an amount of time remaining until regeneration of a water softener system will occur.

As shown in FIG. 9A, at step 902, the processor determines whether at least seven days (e.g., seven consecutive days) of water usage data is available (e.g., available in a set of water usage data stored in a memory device coupled to the processor) for the water softener system associated with the processor. If so, the method proceeds to step 906 via path A. Otherwise, the method proceeds to step 904.

Figure 9B:
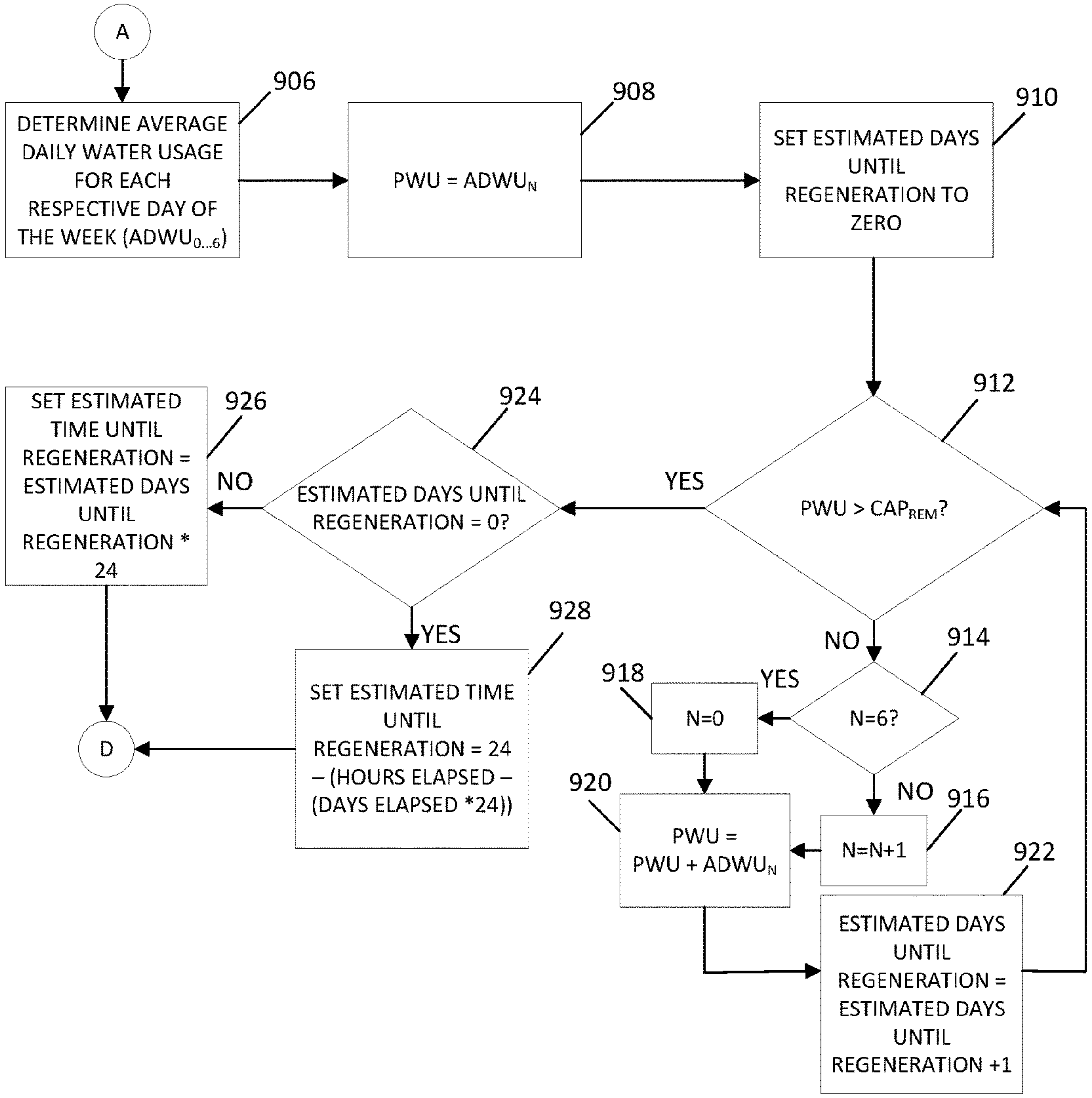

As shown in FIG. 9B, at step 906, in response to determining that at least seven days of water usage data is available, the processor determines the average (e.g., mean) daily water usage for each respective day of the week. For example, the processor may determine respective values for average Sunday water usage (which may be represented as $ADWU_0$), average Monday water usage (which may be represented as $ADWU_1$), average Tuesday water usage (which may be represented as $ADWU_2$), average Wednesday water usage (which may be represented as $ADWU_3$), average Thursday water usage (which may be represented as $ADWU_4$), average Friday water usage (which may be represented as $ADWU_5$), and average Saturday water usage (which may be represented as $ADWU_6$).

At step 908, the processor sets the value of a predicted water usage variable, PWU, equal to the average daily water usage for the current day $ADWU_N$, where N represents the current day of the week. For example, if the method is being performed on a Tuesday, the processor sets $PWU=ADWU_2$.

At step 910, the processor sets a value of the number of days until next regeneration to zero.

At step 912, the processor determines if the predicted water used (PWU) is greater than the remaining capacity ($CAP_{REM}$) of the resin bed of the water softener system. The remaining capacity of the resin bed may be calculated based on water usage data. For example, the resin bed may have a maximum capacity quantified as a predetermined volume of softened water that can be output by the water softener system immediately following regeneration until the resin bed has been saturated with hard water ions and needs to be regenerated again. The remaining capacity of the resin bed may be calculated by the processor by subtracting the amount of softened water output by the water softener system (e.g., determined based on the water usage data derived from the flow rate data generated by the flow meter 630 of FIG. 6) from the maximum capacity of the resin bed. When the remaining capacity of the resin bed reaches zero, the water softener system may automatically initiate a regeneration cycle or may set a flag that causes a regeneration cycle to be initiated at a predetermined (e.g., user defined) scheduled time. Thus, by comparing PWU to $CAP_{REM}$, the processor may effectively determine whether the amount of water predicted to be used within the estimated days until next regeneration exceeds the remaining capacity of the resin bed.

If the processor determines that $PWU>CAP_{REM}$, then the method proceeds to step 924. Otherwise, the method proceeds to step 914.

At step 914, the processor determines whether N=6 (e.g., indicating that the last average daily water usage value added to PWU corresponds to a Saturday). If N=6, the method proceeds to step 918. Otherwise, the method proceeds to step 916.

At step 916, the processor sets N=N+1. This step increments the day of the week represented by N.

At step 918, the processor sets N=0. This step sets the day of the week represented by N to Sunday.

At step 920, the processor, after updating the value of N, sets $PWU=PWU+ADWU_N$. This step increases the value of PWU by the average daily water usage of the day of the week represented by N.

At step 922, the processor sets the estimated days until next regeneration=estimated days until next regeneration+1, thereby incrementing the estimated days until next regeneration.

The loop formed by steps 912-922 causes PWU to be increased by the average daily water usage for the next consecutive day of the week with each iteration and causes the estimated days until next regeneration to be incremented by 1 with each iteration, until the processor determines that $PWU>CAP_{REM}$.

At step 924, in response to determining that $PWU>CAP_{REM}$, the processor determines whether the estimated days until next regeneration equals zero. If so, the method proceeds to step 928. Otherwise, the method proceeds to step 926.

At step 926, the processor sets the estimated time until next regeneration equal to the estimated days until next regeneration times 24. In the present example, the estimated number of days remaining until the next regeneration times 24 may be displayed as the estimated time until next regeneration via the user interface of a client device when the estimated days until next regeneration does not equal zero, with the estimated time until next regeneration being given in units of days. The method then returns to step 902 via path D, and the method repeats. In some embodiments, the method may wait to return to step 902 until new water usage data is determined by the processor to be available.

At step 928, the processor sets the estimated time until regeneration equal to 24—(hours elapsed—(days elapsed*24)). For example, the days elapsed variable may be calculated as the hours elapsed divided by 24, rounded down. In this case, the estimated time until regeneration is given in units of hours. The method then returns to step 902 via path D, and the method repeats. In some embodiments, the method may wait to return to step 902 until new water usage data is determined by the processor to be available.

For example, the hours elapsed may correspond to the number of hours that have elapsed since the most recent regeneration of the water softener system and may be tracked and stored in the memory device.

For example, the number of days elapsed is multiplied by 24, the resulting product is subtracted from the number of hours elapsed (e.g., such that hours of the "hours elapsed" value that are part of complete days that have elapsed are not represented in the resulting difference), and the resulting difference is subtracted from 24 to provide a number of hours remaining until a regeneration is expected to occur.

In the present example, the estimated number of hours remaining until the next regeneration may be displayed as the estimated time until next regeneration via the user interface of a client device when the estimated days until next regeneration equals zero. For example, providing the estimated number of hours remaining until the next regeneration once the estimated number of days until next regeneration reaches zero may provide a user with better resolution of when they can expect the regeneration to occur, based on the water softener system's historical water usage.

Returning to FIG. 9A, at step 904, the processor determines if any water usage data is available (e.g., in the memory device) for the water softener system. If so, the method proceeds to step 930 via path B. Otherwise, the method proceeds to step 940 via path C.

Figure 9C:
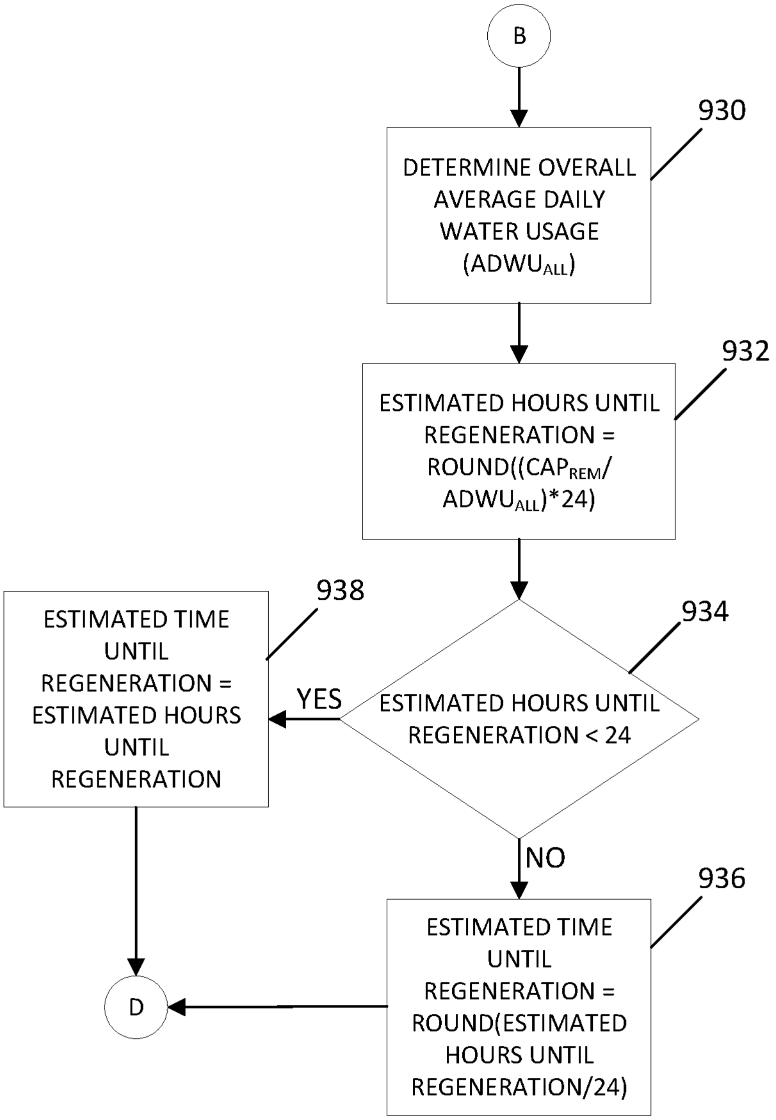

As shown in FIG. 9C, at step 930, the processor determines the overall average daily water usage ($ADWU_{ALL}$) for the water softener system. For example, $ADWU_{ALL}$ may be calculated by taking the simple average (e.g., mean) of all daily water usage data available for the water softener system.

At step 932, the processor sets the estimated hours until next regeneration equal to the $CAP_{REM}$ divided by $ADWU_{ALL}$, multiplied by 24, rounded to the nearest integer.

At step 934, the processor determines whether the estimated hours until next regeneration is less than 24 (e.g., whether it is estimated that less than one day is remaining until the next regeneration will occur). If so, the method proceeds to step 938. Otherwise, the method proceeds to step 936.

At step 938, if the estimated hours until next regeneration is less than 24, the processor sets the estimated time until next regeneration equal to the estimated hours until next regeneration. In this case, the estimated time until next regeneration is given in units of hours. The estimated time until next regeneration may be sent to and displayed at a user interface of a client device (e.g., client device 632 of FIG. 6). The method then returns to step 902 via path D, and the method repeats. In some embodiments, the method may wait to return to step 902 until new water usage data is determined by the processor to be available.

At step 936, if the estimated hours until next regeneration is not less than 24, the processor sets the estimated time until next regeneration equal to the estimated hours until regeneration divided by 24, rounded down, to give the estimated days until regeneration, and which does not account for partial days. In this case, the estimated time until regeneration is given in units of days. The estimated time until next regeneration may be sent to and displayed at a user interface of a client device (e.g., client device 632 of FIG. 6). The method then returns to step 902 via path D, and the method repeats. In some embodiments, the method may wait to return to step 902 until new water usage data is determined by the processor to be available.

Figure 9D:
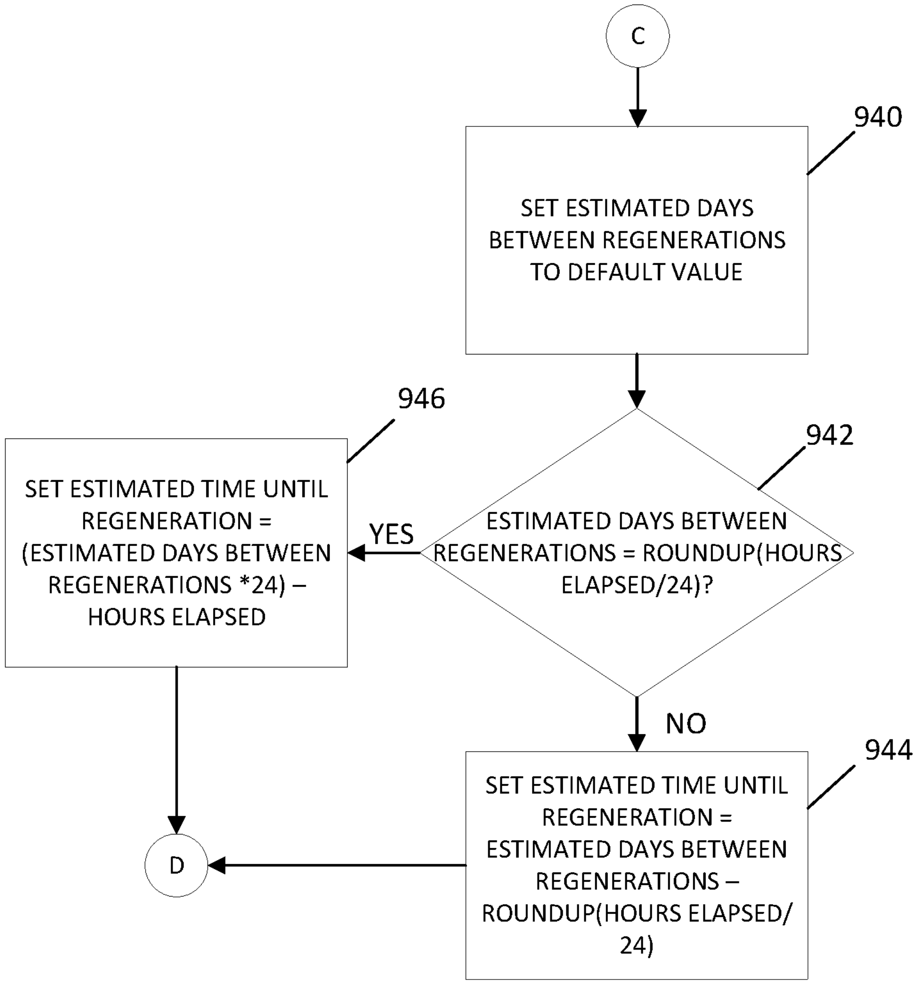

As shown in FIG. 9D via path C, at step 940, in response to determining that no water usage data is available (e.g., either because the system corresponds to the first configuration type, or because the system has not yet collected any flow meter data from which to derive water usage data), the processor sets the estimated days between regenerations to a default value (e.g., four days). The default value may be set according to a user-defined regeneration schedule. Alternatively, the default value may be a default "factory setting" of the water softener system.

At step 942, the processor determines whether the estimated days between regenerations equals the hours elapsed (i.e., hours elapsed since the most recent regeneration of the water softener system occurred) divided by 24, rounded up. If so, the method proceeds to step 946. Otherwise, the method proceeds to step 944.

At step 944, the processor sets the estimated time until regeneration equal to the estimated days between regenerations minus the hours elapsed divided by 24, rounded up (e.g., effectively the number of days elapsed, counting a partial day as an entire day). In this case, the estimated time until regeneration is given in units of days. The estimated time until the next regeneration may be sent to and displayed at a user interface of a client device (e.g., client device 632 of FIG. 6). The method then returns to step 902 via path D, and the method repeats.

At step 946, the processor sets the estimated time until regeneration equal to the hours elapsed (i.e., since the most recent regeneration of the water softener system) subtracted from the product of the estimated days between regenerations and 24. In this case, the estimated time until regeneration is given in units of hours. In this way, the estimated time until regeneration may be displayed in hours when less than one day is expected to remain until regeneration of the water softener system will occur. The estimated time until next regeneration may be sent to and displayed at a user interface of a client device (e.g., client device 632 of FIG. 6). The method then returns to step 902 via path D, and the method repeats.

In the above example, prompts displayed at the user device may be generated by the remote server and sent to the user device, or may be generated by a software application running on the user device in response to instructions received from the remote server or stored on a local memory device of the user device.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

We claim:

1. A water softener system, comprising:
a brine tank;
an outlet pipe;
a sensor device coupled to the outlet pipe being configured to generate flow rate data in response to fluid moving through the outlet pipe; and
an Internet of things (IoT) controller communicatively connected to a gateway, the IoT controller in electronic communication with the water softener system, the IoT controller being configured to:
determine a salt remaining value;
predict a number of regenerations remaining;
generate water usage data based on the flow rate data;
determine a period between regenerations value according to a function of unit capacity of the brine tank, a water hardness value, and an average water use determined using the flow rate data;
determine a time until salt refill using at least the period between regenerations value and the number of regenerations remaining; and
initiate a regeneration cycle of a resin bed of the water softener system responsive to an elapse of the time until salt refill.

2. The water softener system of claim 1, wherein the IoT controller is configured to update the salt remaining value based on user input received from an electronic device.

3. The water softener system of claim 1, wherein the IoT controller is configured to determine the number of regenerations remaining by dividing the salt remaining value by a predefined salt dosage corresponding to an amount of salt expected to be used during a single regeneration operation.

4. The water softener system of claim 1, wherein the IoT controller is configured to determine the period between regenerations by dividing a first quantity by a second quantity, the first quantity being the unit capacity divided by the water hardness value and the second quantity being the average water use over a predefined period determined based on the water usage data.

5. The water softener system of claim 1, wherein the IoT controller is configured to determine the period between regenerations value by dividing a first quantity by a second quantity, the first quantity being calculated by dividing a unit capacity by a water hardness value and then subtracting a predefined portion of resin bed capacity, and the second quantity being an average water use over a predefined period determined based on the water usage data.

6. The water softener system of claim 1, wherein the IoT controller is configured to set the period between regenerations value to a default value responsive to determining that there is not sufficient water usage data available to determine the period between regenerations based on the water usage data.

7. The water softener system of claim 1, wherein the IoT controller is configured to reduce the salt remaining value by a predefined salt dosage in response to the regeneration cycle.

8. The water softener system of claim 1, wherein the IoT controller is configured to cause a first prompt to be displayed on a user interface of an electronic device, the first prompt providing a plurality of selectable options, each of the plurality of selectable options including a respectively different qualitative description of the salt in the brine tank.

9. The water softener system of claim 8, wherein the IoT controller is configured to:

compare, based on a selected option from the plurality of selectable options, the number of regenerations to a predetermined regeneration threshold to produce a result; and adjust the salt remaining value based on the result.

10. The water softener system of claim 8, wherein the IoT controller is configured to:

cause a second prompt to be displayed on the user interface, the second prompt displaying an option to provide one of an amount added or an amount reduced;

receive the one of an amount added or an amount reduced via the user interface; and adjust the salt remaining value based on the one of an amount added or an amount reduced received.

11. The water softener system of claim 1, wherein the IoT controller is configured to cause the salt remaining value to be displayed on a user interface of an electronic device.

12. The water softener system of claim 1, wherein the IoT controller is configured to determine the time until salt refill by subtracting an amount of softened water output by the water softener system from a maximum capacity of the resin bed.

13. A water softener system comprising:

a brine tank;

an outlet pipe;

a sensor device coupled to the outlet pipe being configured to generate flow rate data in response to fluid moving through the outlet pipe; and an Internet of things (IoT) controller communicatively connected to a gateway, the IoT controller configured to:

determine a salt remaining value;

predict a number of regenerations remaining;

determine a period between regenerations value according to a function of unit capacity of the brine tank, a water hardness value, and an average water use determined using the flow rate data;

determine a time until salt refill using at least the period between regenerations value and the number of regenerations remaining;

initiate a regeneration cycle of a resin bed of the water softener system responsive to an elapse of the time until salt refill.

14. The water softener system of claim 13, wherein the period between regenerations value is a default value based on a defined regeneration schedule.

15. The water softener system of claim 13, wherein the IoT controller is configured to generate water usage data based on the flow rate data.

16. The water softener system of claim 13, wherein the controller is configured to reduce the salt remaining value by a predefined salt dosage in response to initiation of the regeneration cycle.

17. The water softener system of claim 13, wherein the IoT controller is configured to determine the time until salt refill by subtracting an amount of softened water output by the water softener system from a maximum capacity of the resin bed.

18. The water softener system of claim 13, wherein the IoT controller is further configured to:

determine whether the time until salt refill is below a predetermined threshold, and responsive to determining that the time until salt refill is below a threshold, generate and transmit an alert to an electronic device in electronic communication with the IoT controller, the alert indicating that salt should be added to the brine tank.

* * * * *